US011124437B2

(12) United States Patent
Skardon

(10) Patent No.: US 11,124,437 B2
(45) Date of Patent: Sep. 21, 2021

(54) SYSTEM AND APPARATUS FOR A MOBILE, MODULAR AGRICULTURAL BIOREACTOR, AND METHODS RELATED THERETO

(71) Applicant: Tailwater Systems, Inc., Seaside, CA (US)

(72) Inventor: John N. Skardon, Seaside, CA (US)

(73) Assignee: Tailwater Systems, LLC, Seaside, CA (US)

( * ) Notice: Subject to any disclaimer, the term of this patent is extended or adjusted under 35 U.S.C. 154(b) by 0 days.

(21) Appl. No.: 16/031,614

(22) Filed: Jul. 10, 2018

(65) Prior Publication Data

US 2019/0010069 A1 Jan. 10, 2019

Related U.S. Application Data

(60) Provisional application No. 62/530,483, filed on Jul. 10, 2017, provisional application No. 62/534,806, filed on Jul. 20, 2017.

(51) Int. Cl.
*C02F 3/28* (2006.01)
*C02F 3/00* (2006.01)
(Continued)

(52) U.S. Cl.
CPC ............ *C02F 3/2806* (2013.01); *C02F 1/006* (2013.01); *C02F 3/006* (2013.01); *C02F 3/2833* (2013.01); *C02F 3/305* (2013.01); *C02F 3/341* (2013.01); *C02F 1/001* (2013.01); *C02F 1/441* (2013.01); *C02F 1/444* (2013.01); *C02F 2101/163* (2013.01); *C02F 2103/001* (2013.01); *C02F 2103/10* (2013.01); *C02F 2201/007* (2013.01); *C02F 2201/008* (2013.01); *C02F 2209/008* (2013.01); *C02F 2209/02* (2013.01); *C02F 2209/04* (2013.01); *C02F 2209/06* (2013.01); *C02F 2209/10* (2013.01);
(Continued)

(58) Field of Classification Search
CPC .......... C02F 1/006; C02F 1/444; C02F 1/441; C02F 1/001; C02F 3/2806; C02F 3/305; C02F 3/2833; C02F 3/341; C02F 3/006; C02F 2103/10; C02F 2103/001; C02F 2201/008; C02F 2201/007; C02F 2209/06; C02F 2209/10; C02F 2209/02; C02F 2209/18; C02F 2209/04; C02F 2209/008; C02F 2209/15; C02F 2101/163; C02F 2305/06
USPC ......................................................... 210/610
See application file for complete search history.

(56) References Cited

U.S. PATENT DOCUMENTS 4,547,286 A 10/1985 Hsiung
4,671,879 A * 6/1987 Solt .......................... B01J 41/04
210/610

(Continued)

OTHER PUBLICATIONS

Baker, L. A. Design considerations and applications for wetland treatment of high-nitrate waters. Water Science and Technology, 38(1) 1998.

(Continued)

*Primary Examiner* — Nam X Nguyen
*Assistant Examiner* — Julia L. Wun
(74) *Attorney, Agent, or Firm* — Heslin Rothenberg Farley & Mesiti, P.C.

(57) ABSTRACT

A modular and mobile unpressurized bioreactor for removing nitrate from water, and methods and systems thereof.

22 Claims, 15 Drawing Sheets

(51) Int. Cl.
*C02F 3/34* (2006.01)
*C02F 3/30* (2006.01)
*C02F 1/00* (2006.01)
*C02F 101/16* (2006.01)
C02F 103/00 (2006.01)
C02F 103/10 (2006.01)
C02F 1/44 (2006.01)

(52) U.S. Cl.
CPC ...... *C02F 2209/15* (2013.01); *C02F 2209/18* (2013.01); *C02F 2305/06* (2013.01)

(56) References Cited

U.S. PATENT DOCUMENTS

| | | | | |
|---|---|---|---|---|
| 4,863,606 | A * | 9/1989 | Ryall | C02F 3/087 210/605 |
| 5,228,995 | A * | 7/1993 | Stover | C02F 1/006 210/150 |
| 5,232,585 | A | 8/1993 | Kanow | |
| 5,389,248 | A | 2/1995 | Pare et al. | |
| 5,482,630 | A | 1/1996 | Lee et al. | |
| 5,681,471 | A * | 10/1997 | Silverstein | C02F 3/2806 210/614 |
| 6,126,829 | A | 10/2000 | Gunnarsson et al. | |
| 6,146,531 | A | 11/2000 | Matheson | |
| 6,767,464 | B2 | 7/2004 | Boyd et al. | |
| 6,863,815 | B1 | 3/2005 | Smith | |
| 6,887,373 | B2 | 5/2005 | McCoy | |
| 7,462,284 | B2 | 12/2008 | Schreier et al. | |
| 8,616,396 | B2 | 12/2013 | Carter | |
| 8,759,251 | B2 | 6/2014 | Long | |
| 8,894,857 | B2 | 11/2014 | Liu et al. | |
| 9,073,617 | B2 | 7/2015 | Blum | |
| 9,365,434 | B2 | 6/2016 | Wilder et al. | |
| 9,399,535 | B2 | 7/2016 | Downey et al. | |
| 2006/0124542 | A1 * | 6/2006 | Strawn | C02F 3/10 210/611 |
| 2015/0151995 | A1 * | 6/2015 | Pickett | C02F 3/286 210/617 |
| 2015/0368131 | A1 * | 12/2015 | Garrido Fernandez | C02F 3/301 210/605 |
| 2016/0122705 | A1 * | 5/2016 | Lancaster | C02F 3/301 435/29 |
| 2017/0254062 | A1 * | 9/2017 | Fink | A01G 9/033 |

OTHER PUBLICATIONS

Beutel, M. W., Newton, C. D., Brouillard, E. S., & Watts, R. J. Nitrate removal in surface-flow constructed wetlands treating dilute agricultural runoff in the lower Yakima Basin, Washington. Ecological Engineering, 35(10) 2009.

Brown, J. C. Biological treatments of drinking water. In National Academy of Engineering. Frontiers of Engineering: Reports on Leading-Edge Engineering from the 2007 Symposium. National Academies Press, Washington DC. Retrieved from http://www.inovasyon.org/pdf/NAE.symposium.2007.pdf 2008.

Budd, R., O'Geen, A., Goh, K. S., Bondarenko, S., & Gan, J. Efficacy of Constructed Wetlands in Pesticide Removal from Tailwaters in the Central Valley, California. Environmental Science & Technology, 43(8), 2925-2930. Retrieved from https://doi.org/10.1021/es802958q 2009.

Christianson, L. E. Design and performance of denitrification bioreactors for agricultural drainage. Retrieved from http://lib.dr.iastate.edu/etd/10326/ 2011.

Harter, T. Addressing Nitrate in California's Drinking Water: With a Focus on Tulare Lake Basin and Salinas Valley Groundwater: Report for the State Water Resources Control Board Report to the Legislature. Center for Watershed Sciences, University of California, Davis. 2012.

Hem, L. J., Rusten, B., & Ødegaard, H. Nitrification in a moving bed biofilm reactor. Water Research, 28(6). 1994.

Herzon, I., & Helenius, J. (2008). Agricultural drainage ditches, their biological importance and functioning. Biological Conservation, 141(5). 2008.

Moorman, T. B., Parkin, T. B., Kaspar, T. C., & Jaynes, D. B. Denitrification activity, wood loss, and N$_2$O emissions over 9 years from a wood chip bioreactor. Ecological Engineering, 36(11). 2010.

Rusten, B., Eikebrokk, B., Ulgenes, Y., & Lygren, E. Design and operations of the Kaldnes moving bed biofilm reactors. Aquacultural Engineering, 34(3). 2006.

Schipper, L. A., Robertson, W. D., Gold, A. J., Jaynes, D. B., & Cameron, S. C. Denitrifying bioreactors—an approach for reducing nitrate loads to receiving waters. Ecological Engineering, 36(11). 2010.

Van Iterson Jr, G. Accumulation experiments with denitrifying bacteria. Koninklijke Nederlandse Akademie van Wetenschappen Proceedings Series B Physical Sciences, 5. 1902.

Van Niel, C. B., & Allen, M. B. A note on Pseudomonas stutzeri. Journal of Bacteriology, 64(3). 1952.

* cited by examiner

SYSTEM AND APPARATUS FOR A MOBILE, MODULAR AGRICULTURAL BIOREACTOR, AND METHODS RELATED THERETO

CROSS-REFERENCE TO RELATED APPLICATIONS

This application claims priority to U.S. Provisional Patent Application Ser. No. 62/530,483, filed Jul. 10, 2017, entitled "Agricultural Bioreactor", and U.S. Provisional Patent Application Ser. No. 62/534,806, filed Jul. 20, 2017, entitled "Bioreactor Monitoring Network," the entire contents of which are hereby incorporated herein by reference in their entirety.

FIELD OF THE INVENTION

The present invention relates generally to an apparatus and system for the removal of nitrate from nitrate-contaminated wastewater and well water, and more particularly to a compact, modular and portable upflow denitrification apparatus and system utilized to treat nitrate-contaminated water and/or wastewater, and methods relating to the same.

BACKGROUND OF THE INVENTION

Nitrate is one of, if not, the most prevalent wastewater contaminants worldwide. Irrigation and other forms of agricultural run-off water, as well as other forms of water and/or wastewater (e.g., sewage-disposal, oil recovery, and industrial sources) may typically comprise, among other pollutants, nitrate or other forms nitrogen. More specifically, it is known in the art that 15-20 percent of nutrients (fertilizer such as nitrate and phosphorus) applied to crops are lost through subsurface and surface drainage of the applied irrigation water. Surface drainage of irrigation water can carry these nutrients into local drainage ditches and eventually into lakes, ponds, and coastal areas. Once the nutrients reach the larger bodies of water, they can accelerate eutrophication—a major environmental problem. Eutrophication can harm fish and other valuable species in the watershed, cause odor problems, and cause economic damage to local hospitality and tourism industries.

Irrigation water can also carry nutrients down through the soil into underlying aquifers or groundwater that are also used by rural communities for drinking water. These nutrients can accumulate over time. Wells that test higher than state or federal laws for drinking water contaminants like nitrate can be shut down by regulatory authorities. With the loss of the well water, homeowners and users must either dig a new well or rely on bottled water for drinking, cooking, and bathing—an extremely expensive proposition.

Accordingly, it is desirable to remove nitrate from contaminated water before recycling or reintroducing treated water into the environment, as there are often limitations placed on the discharge of nitrogen compounds into surface or subsurface drainage. Treatment of nitrate-contaminated waters, including but not limited to irrigation water, is known in the art and treatment systems and methodologies range from various filtration methods such has ion exchange and reverse osmosis. These existing nitrate-removal processes, e.g. ion exchange and reverse osmosis, can remove but do not alter nitrate and other inorganic and organic contaminants from water. As a result, these processes produce a nitrate-rich brine or concentrate.

Most local and state water regulatory authorities will not allow rural communities to discharge this waste back into the ground via septic systems, leach fields, or other surface disposal. The only other solution is usually hauling off the nitrate-rich brine or concentrate, which is often too expensive for many small and/or rural communities. Accordingly, there is a need to optimize denitrification systems to handle the nitrate-rich concentrate which is produced.

Nitrogen is also one of the most plentiful elements on the planet. As a result, there are extensive numbers of aerobic and anaerobic bacteria that can convert nitrogen to its many forms. Ammonia fertilizer, for example, is converted to nitrate via soil bacteria. Nitrate can be used by plants for growth. In many watersheds, nitrate can also be reduced to nitrogen gas and carbon dioxide by a number of anaerobic and aerobic bacteria.

Removal of nitrogen from waste water by the use of nitrifying and denitrifying bacteria generally involves conversion of organic nitrogen and ammonia into nitrates, followed by removal of the nitrates by denitrifying microorganisms to yield nitrogen gas. Converting organic nitrogen and ammonia to nitrates typically results in removal of carbon from the system. Because carbon is required in the denitrification process, it is typically reintroduced into the system by the addition of external carbon source, for example methanol. The introduction of external carbon source generally results in the production of nitrogen gas, carbon dioxide, and water.

Large scale, industrial biological denitrification systems for treating and removing nitrogen from wastewater from water treatment plants are known in the art. These systems are generally expensive; permanent in that they are made of a "hard construction"-cement, concrete, steel and other components; and they use the above nitrification/denitrification two-step approach to (1) reduce ammonia to nitrate via an aerobic process, followed by (2) an anaerobic treatment to reduce the nitrate to nitrogen gas. These systems achieve very high rates of denitrification, often greater than 2000 grams of nitrate-nitrogen reduced per day per cubic meter of bioreactor volume. These systems typically designed for, and thus require, a substantially steady-state system, including but not limited to a generally constant stream of nitrate-containing waste water, wherein the term "steady state" for purposes of this disclosure refers to both a minimum-maximum flow rate range with minimal flux and/or a minimum-maximum nitrate load range with minimal flux.

Also known in the art, certain large scale, industrial water treatment plants incorporate moving bed biofilm reactors (MBBR), a modification of traditional waste treatment bioreactors, into their biological denitrification systems. See, e.g. U.S. Pat. No. 6,126,829. The MBBR-style reactors are generally "upflow", meaning that the wastewater enters from the bottom and exits the top of the reactor. These MBBR-style reactors typically contain a large number of small plastic biofilm carriers. The bacteria colonize the biofilm carriers. A high "active surface area to volume ratio" (or "surface to volume ratio" provided by the carriers concentrates a large amount of bacteria in a small volume. As the contaminated water moves up through the bioreactor and the biofilm carriers, the carriers tend to roll and rotate, creating a kind of shearing force that will clean off excess biomass growth. The combination of these effects contribute to increased denitrification rates. However, the large-scale, industrial MBBR-style reactors and systems currently known in the art and integrated into waste water treatment systems are impractical in rural or agricultural areas due to very high upfront capital costs and requirements for extensive pipelines to bring waste water to the water treatment plant. As discussed above, they also typically require a generally steady stream of nitrate-containing waste water. In addition, the operation of these large-scale systems is highly regulated requiring state certified operators.

Similarly, U.S. Pat. No. 5,681,471 to Silverstein, which discloses a basic biological treatment systems for treating well water to produce drinking water, requires a fixed, pressurized denitrification tank, followed by a roughing filter and sand filter for polishing. It too was optimized for a relatively constant stream of nitrate-containing water from the well water supply. Moreover, as it was a pressured system, it required the use of expensive fiberglass or steel tanks. Second, this design assumes that the incoming concentration of $NO_3$—N would be relatively constant from the well water supply.

As such, the options currently available to treat nitrate contamination on a small scale level are limited. Additional, cost-effective technology to remove nitrate from drinking water is needed, in particular technology that is effective, safe, less expensive and practical at the smaller-scale household, agricultural, oil field and livestock supply scales. To that end, and in response to the rapid growth of the excess nitrate problem worldwide, scientists have investigated many types of low tech solutions, one of which is bioremediation. Runoff from agricultural operations typically contains water soluble inorganic and organic chemicals such as nitrate, sulfate, sodium, phosphorus and other chemicals. Treating agricultural runoff has been done in a limited number of locations by bioremediation. This technique involves the creation of artificial wetlands and other types of man-made vegetated basins and buffers (i.e. a "bioremediation basin"). Ideally, agricultural runoff or "tailwater" flows into these basins prior to entering into a public drainage ditch or water body. Water that is left in these basins for extended periods (days to weeks) will show a decline in nitrate due the presence of naturally occurring denitrifying bacteria and select species of plants that will consume some of the nitrate (phytoremediation).

Since the rate at which nitrate is remediated is very slow in these systems, these remediation basins must be made very large. As a result, many farmers with high nitrate levels in their tailwater are unwilling to dedicate a substantial amount of their fields to create these bioremediation basins. Further, these wetlands can create habitat for birds and other species. The presence of this kind of habitat close to an agricultural area can create a variety of unintended legal problems for growers if the birds and animals enter into the fields.

A further limitation of these large, bioremediation basins is their inability to treat water contaminated with high nitrate levels (i.e. 15-20 mg/L $NO_3$—N or higher). In certain major agricultural areas of the world, agricultural runoff (or tailwater) may contain nitrate-nitrogen ($NO_3$—N) levels routinely above 50 mg/L ($NO_3$—N) in many drainage areas, and often over 100 mg/L ($NO_3$—N).

Another proposed approach for treating agricultural tailwater are woodchip bioreactors (WBR), which are below ground trenches lined with plastic and then filled with woodchips. A plastic liner covers the woodchips and is then covered with an over-burden of dirt. Tailwater is directed into one end of the WBR. After several days (i.e. 2-30 days), water exits the opposite end of the bioreactor trench. Over time denitrifying bacteria will colonize the surface of the woodchips. The bacteria colonizing the woodchips will slowly consume the woodchips, which also act a carbon substrate for the denitrifying bacteria. While attractive because of their simplicity, WBRs are not used in production systems in the United States. They are often quite expensive to construct because of the large area and extensive excavation required, and they suffer from numerous problems when compared to industrial denitrification systems. First, like the bioremediation basins, the rate of denitrification is very slow in a WBR compared to industrial wastewater systems. Second, long hydraulic retention times (ranging from 2 to 30 days) require designers to dramatically increase woodchip bioreactor area and volume. Third, the woodchip bioreactors are hard construction and are not mobile, requiring a permanent modification to the farmers' valuable growing area. Fourth, because of the horizontal and laminar flow conditions inside these long underground trenches, sediment carried by the incoming tailwater will deposit near the inlet of the reactor over time, ultimately leading to blockage and channelization. Channelization dramatically reduces the hydraulic residence time within the WBR and, as a result, the amount of denitrification also decreases. Fifth, the effectiveness of a WBR declines over time as the woodchips are consumed by the bacteria. However, because the reactors are essentially buried, maintenance is impractical as cleaning out the WBR to restore flow or replace the woodchips requires total removal of the over-burden (dirt), and the use of a backhoe or other piece of heavy equipment to dig out the woodchips.

Other processes for eliminating nitrates from water by denitrification in microbiological reactors are also known, for example the use of rising current reactors containing a granular denitrifying biomass.

In any of these systems, anaerobic biological denitrification relies on creating specific conditions inside the bioreactor. First, the dissolved oxygen (DO) levels must be low enough to assure that the facultative anaerobes will consume the nitrate molecule, rather than oxygen. Second, pH conditions must kept within range of the denitrifying bacteria community in the reactors. Third, the carbon:nitrogen:phosphorus ratios must be kept in the proper range for the bacteria to thrive.

In practice, and in regards to the carbon:nitrogen:phosphorus ratio, the nitrogen is provided via the nitrate in the tailwater. Furthermore, in some areas, phosphorus is available in the agricultural surface tailwater and/or it is added to the system. Biologically available carbon, however, often is not present at any appreciable levels in the tailwater and must be continuously added to the denitrifying bioreactor. In industrial wastewater treatment systems that utilize MBBR-style denitrifying bioreactors, for example, the external, biologically-available carbon sources most commonly used are methanol and aqueous acetic acid (i.e. hydrogen acetate). However, transporting external carbon to a denitrifying bioreactor dominates the day to day operating costs of these MBBR-style reactors, and fluctuations in commodity prices for external carbon sources such as methanol create uncertainty for system operators. Furthermore, while acetate is a highly attractive carbon source for denitrification due to the very high rate of reaction, conventionally-supplied acetic acid is also corrosive, hazardous and difficult to transport and/or handle during operation, which is problematic.

Accordingly, there is a need to optimize the technologies for supplying and/or maintaining a carbon source for introduction into the denitrification systems. More specifically, an innovation in the external carbon source could lower costs and make the process more attractive to a wider audience. Novel solutions for providing a localized, economical and widely available external carbon source are also provided herein. In particular, the disclosure herein contemplates a technology that allows one to use existing agricultural waste products and acetate-forming bacteria to produce a local source of acetate-based carbon source, as required by the denitrifying bacteria.

As mentioned above, large scale industrial denitrification systems known in the art that form part of a water and waste water treatment facility assume and depend on a substantially steady state or constant operation. In contrast, agricultural environments generally do not provide and cannot be characterized as having "steady state" conditions and, therefore, the denitrification systems currently available are not suitable for treating agricultural tailwater or similar non-steady state systems. For example, the application of nutrients and irrigation only occur during specific times for each crop throughout the year. This leads to highly varying flows (i.e. high fluctuations) of wastewater, as well as high variations in the amount of nitrate in the wastewater flow. Furthermore, since agricultural fields are separated into blocks, it is possible that some blocks may lie fallow for several weeks or months and a permanent or fixed denitrification system may not be receiving any tailwater during this time. As such, there is a need for a lightweight, inexpensive, simple, modular and mobile denitrification bioreactor system that can be either turned off, and/or moved from site to site, to treat the agricultural runoff on an as-needed basis. For the same reasons, a system that is easy and flexible, in that it can be readily monitored and adjusted to effectively treat a variable nitrate-load within the water or waste water is needed. Furthermore, space restrictions for water and/or wastewater treatment facilities coupled with a growing treatment demand have resulted in a need for more effective, efficient water or wastewater denitrification systems that occupy a smaller footprint than previous systems.

Accordingly, there is a need today for a nitrate-contaminated water and/or waste water treatment apparatus which best optimizes cost efficiencies in construction, operation, maintenance and portability. It thus is an object of the present disclosure to provide a small-scale, modular, unpressurized bioreactor for treating nitrate-contaminated water and/or waste water. Accordingly, it is desirable to provide a water and/or wastewater denitrification system that can effectively and efficiently remove excess nitrates from water and/or wastewater while not increasing the footprint required for such system.

The primary limitations of the above-described processes (for example, but not limited to, the high upfront capital cost; need for an appropriate, inexpensive carbon source; limitations on nitrate loads/levels that can be treated; and/or the inability to deal with fluctuations in flow) have precluded the use of treating nitrate-laden waters using denitrification on a wide spread basis outside of large-scale waste water treatment plants. The present invention is directed to overcoming the above-identified and other deficiencies in the art. It is a further object of the present disclosure to provide a localized, external carbon source that is widely available and cost efficient. Furthermore, such a system should be capable of degrading water fluxes which may contain high nitrate levels, and of treating low water flow rates. Novel solutions specific to issues encountered by rural drinking water systems, the oil field industry and the agricultural industry are also provided herein.

SUMMARY OF THE INVENTION

In light of the foregoing, one of the main objects of this invention is to provide an apparatus for treating, in a practical, portable and cost-effective manner, water contaminated by nitrates.

In accordance with embodiments of the invention, a mobile, modular water or wastewater treatment system for removing nitrate from water or wastewater, is provided, comprising an external, pressurized water source comprising nitrate-contaminated source water; an anaerobic, denitrifying bioreactor, wherein said bioreactor comprises at least one unpressurized, upflow bioreactor vessel comprising a vertically-extending housing that forms a wall, a floor and a cover of said bioreactor vessel and configured to contain and define a vertical passageway for nitrate-contaminated source water to be treated, the bioreactor vessel further comprising an upflow water inlet, said water inlet located substantially at or near the bottom of the bioreactor vessel and configured to receive the nitrate-contaminated source water into a tower portion of said bioreactor vessel, wherein said influent inlet is in fluid communication with a source inlet pipe connected to the external, pressurized water source; an effluent port located substantially at or near a top of the bioreactor vessel, fluidically connected to an external discharge point, and operably configured to discharge denitrified water from the top of said bioreactor vessel to the discharge point, such that a vertical, upflow is created during operation of the bioreactor; a plurality of biofilm carrier elements disposed in and partially filling said housing of the at least one bioreactor vessel, wherein the biofilm carrier elements are configured to grow a denitrifying bacteria consortia thereon for denitrification of the nitrate-contaminated source water as the source water flows upwards in said bioreactor vessel towards the effluent outlet located substantially at the top of the bioreactor; a source of one or more anaerobic, denitrifying bacteria effective for denitrification under anaerobic conditions; and a pump for introducing a nutrient source into the bioreactor vessel under anaerobic conditions to promote biological denitrification, wherein said nutrients are selected from the group comprising a single carbon source, a premixed multiple carbon source, a micronutrient, or a combination thereof.

In still other embodiments, the at least one plastic water tank has dimensions selected to maintain a flow rate of at least 0.3 GPM/ft$^2$ through the bioreactor vessel. In other embodiments, the pump for introducing the nutrient source is configured to control the rate of the nutrient source injected into the system in order to maintain a carbon-nitrogen-phosphorus ratio effective for anaerobic, denitrification to occur in the vessel, and wherein the rate of the nutrient source injected into the system is dependent on the oxidation-reduction potential measured at the discharge point which has a target value of −50 to +50 mV.

In still other embodiments, a method treating nitrate-contaminated water using a modular, portable denitrification water treatment system is provided.

BRIEF DESCRIPTION OF THE DRAWINGS

The present invention will hereinafter be described in conjunction with the following drawing figures, wherein like numerals denote like elements, and.

DETAILED DESCRIPTION OF EMBODIMENTS OF THE INVENTION

Figure 1:
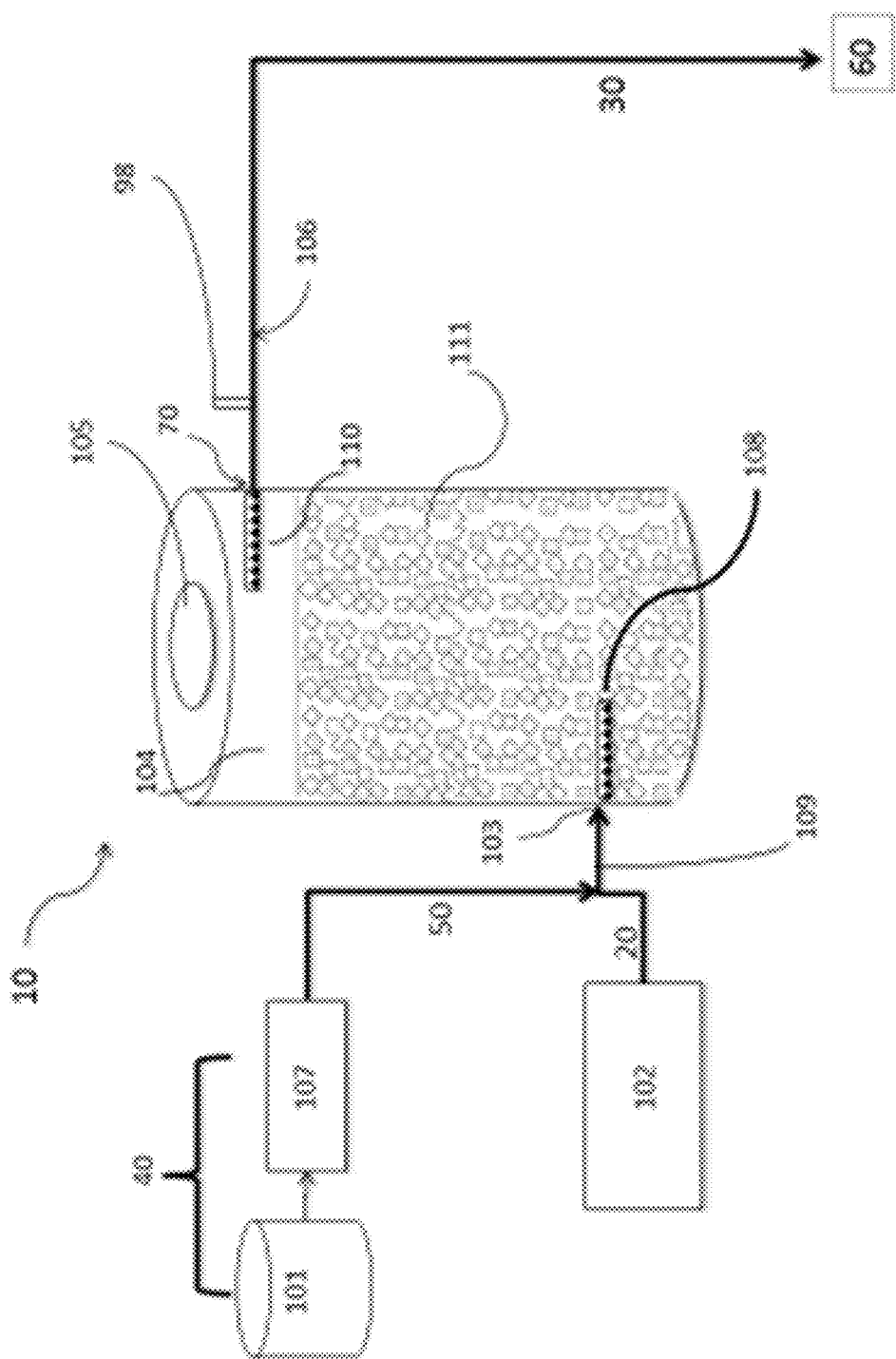
FIG. 1 is a schematic diagram of a modular, up-flow denitrification system in accordance with certain embodiments of the invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

FIGS. 1-15 provide illustrations of various embodiments of the device, system and method of the present invention. With respect to FIGS. 1-15, the various embodiments are shown to include reference numerals to identify various aspects of the embodiments of the device, system and method of the present invention. As set forth below, the reference numerals identified above and referred to in FIGS. 1-15 are further described below, although such descriptions are only exemplary and not intended to limit the embodiments of the present invention only to the below descriptions. Further, the embodiments of the present invention are not required to include all of the items identified by reference numerals in FIGS. 1-15.

Definitions

As used herein, the term "conduit" refers to piping or to any other conduit-type structure suitable for conveying process streams of the type encountered in the disclosed process.

As used herein, the expression "denitrification" refers to an anaerobic process whereby nitrates are converted to atmospheric nitrogen ($N_2$).

As used herein, the term "upflow" refers to an apparatus, method or system where the water to be treated enters from the bottom (or near the bottom) of a bioreactor and exits the top (or near the top) of the bioreactor.

As used herein, the term "anoxic" refers to water that substantially or completely deficient or void of oxygen ($O_2$).

As used herein, the term "oxidation reduction potential" or "ORP" refers to a measure of the ability or potential for the system disclosed herein to permit the desired biological reactions (oxidation and or reduction).

The present invention is generally directed to a mobile, modular up-flow anaerobic denitrification system for treating nitrate-contaminated water and/or wastewater, in particular but not limited to agricultural run-off (i.e. tailwater) and/or irrigation water. Embodiments of the present invention further provide a small scale nitrate-removal system and device that uses anaerobic, denitrifying bacteria to remove nitrate from the water or waste water associated with the agricultural industry, farms, rural waste water treatment facilities, the oil and gas industry, rural communities and small businesses.

In certain embodiments of the invention, the apparatus, system and/or method according to the present invention comprises at least three principle components:

(1) a modular up-flow bioreactor that comprises at least one portable or mobile bioreactor tower or vessel, the tower consisting of a vertically-oriented unpressurized plastic water tank filled with biofilm carrier elements in an amount sufficient to create a moving bed biofilm reactors (MBBR) within the tank(s);

(2) a source of anaerobic denitrifying bacteria isolated from a high-nitrate laden water environment, preferably an environment local to the source water to be treated; and (3) a carbon source, preferably low-cost and/or local.

Due to its modular nature, the system of the present invention is cost effective, mobile and produces sufficient quantities of treated water for small scale usage, with a minimal foot print.

With reference to FIG. 1, an up-flow denitrification system 10 is shown and depicted. In embodiments of the invention, denitrification system 10 is a compact, low power and transportable (i.e. mobile or portable) bioreactor system. As shown in FIG. 1, denitrification system 10 comprises at least three subsystems, namely a bioreactor vessel (or tower) 104, a water source 102, and a carbon injection system 40. In operation, denitrification system 10 receives externally-pressurized nitrate-contaminated water and/or wastewater to be treated as influent 20 and, following treatment within the bioreactor vessel 104, denitrification system 10 discharges the treated, denitrified water as effluent 30.

In embodiments of the invention, bioreactor system 10 comprises at least one unpressurized, vessel or tower 104 forming a single internal chamber, said chamber being defined by a vertically-extending housing unit that forms a wall, a floor and an open-topped cover and configured to contain the water to be treated and to define a vertical passageway for the flow of water there through (i.e. a vertical water column). In embodiments disclosed herein, vessel or tower 104 has a generally cylindrical configuration and a longitudinal axis that is oriented generally vertically. Vessel 104 may be constructed of any of suitable plastic material, preferably PVC. For example, and in exemplary embodiments herein, vessel 104 comprises a common, unpressurized plastic water tank with a removable man-way 105, which are commercially available at agricultural supply stores. Because system 10 can be constructed of and utilize unpressurized plastic tanks, in certain embodiments this can result in a cost savings of about 80-85% in capital costs (as compared to a system that would require a fiber glass tank that can function under pressure).

In embodiments of the invention, the dimensions of vessel 104, as well as the quantity of vessels 104 used in the system, will be determined by the specifications and needs of the nitrate-containing source water to be treated. Although not meant to be limiting, in an exemplary embodiment, one or more 3000 gallon plastic water tanks (10 feet height×8 feet diameter) are used. In still other embodiments in accordance with the invention, vessel 104 will have volume capacity in the range of 600 to 6000 gallons, including all ranges and subranges therein. For example, in some embodiments, vessel 104 will have volume in the range of about 600-1000, 600-2000, 600-4000, 650-5000, 1000-5000, 2000-6000 gallons. More specifically, in some embodiments, vessel 104 will have volume of about 600, 650, 700, 800, 900, 1000, 1500, 2000, 3000, 4000, 4500, 5000, or 6000 gallons.

In embodiments in accordance with the invention, vessel 104 will have a height in the range of about 4 to 12 feet, including all ranges and subranges therein. For example, in some embodiments, vessel 104 will have height in the range of about 4 to 9, 4 to 12, 5 to 9, 5 to 10, or 5 to 12 feet. More specifically, in some embodiments, vessel 104 will have volume of about 4, 4.3, 5, 5.2, 5.4, 6, 7, 8, 9, 9.2, 10, 11, or 12 feet.

In embodiments in accordance with the invention, vessel 104 will have a diameter in the range of 2 to 12 feet, including all ranges and subranges therein. For example, in some embodiments, vessel 104 will have a diameter in the range of about 2 to 6, 2 to 8, 2 to 10, 3 to 7, 3 to 9, 4 to 9, 4 to 10, 4 to 12, 5 to 10, or 5 to 12 feet. More specifically, in some embodiments, vessel 104 will have volume of about 2, 2.3, 3, 3.2, 4, 5, 6, 7, 8, 9, 9.2, 10, 11, or 12 feet.

In accordance with the invention, the water tank, i.e. vessel 104 is unpressurized (internal pressure equal to about zero psi). The unpressurized nature of vessel 104 is, in part, provided providing a means for any $N_2$ and $CO_2$ gas bubbles that are produced with the vessel to vent or be released out of the top of the vessel 104 and exit the tank through manway 105.

In order to provide a fully modular and mobile system, in exemplary embodiments the at least one or more vessel 104 comprises a plastic water tank of a size and weight that provides for easy transport to the location to be treated. The particular specifications of the bioreactor vessel or tower 104, including, but not limited to its material, diameter, height, and the thickness of the walls, will depend upon the circumstances of the specific denitrification system. Some of the factors that may affect the specifications of bioreactor vessel 104 may include, by way of example only, the volume of water being treated and the flow rate, the nitrate concentration in the source water, the number of reactors 104 being used, the expected duration of the denitrification process, temperature, operating pressure, and operating flow volume, as will be understood by one skilled in the art.

In accordance with embodiments of the invention, the at least one vessel 104 has a plurality of biofilm carrier elements 111 provided therein and configured so that a consortia of one or more bacteria effective for anaerobic, biological denitrification are attached to and supported on biofilm carriers 111. Vessel 104 is partially filled with plastic biofilm carriers 111 in an amount sufficient to provide for what is known in the art as a moving bed biofilm reactor (MBBR). In certain embodiments, the term "partially filled" means that the percent volume of vessel 104 filled with carriers 111 will be in the range of about 40-90% of the tank volume, including all ranges and subranges therein (for example, 40-50%, 40-65%, 50-75%, 60-75%, 80-90%) in order to achieve the required net volume in the tank.

The net volume in vessel 104 is based on an experimentally determined nitrate reduction coefficient, in accordance with methods known to those skilled in the art and further described herein. For example, in certain embodiments in accordance with the invention, vessel 104 will have net volume (where net volume=volume of the one or more tanks minus the volume of the biofilm carriers) in the range of about 2500-7500 gallons, preferably about 4500-5500 gallons, including all ranges and subranges therein.

In embodiments of the invention, bioreactor vessel 104 comprises synthetic (i.e. plastic) biofilm carriers 111. The biofilm carriers 111 host various microorganisms which, under proper circumstances, remove nitrate from influent 20. The biofilm carriers 111 are neutrally buoyant and distributed throughout the vertical water column inside the bioreactor tower 104, and they will be sized and configured to support and foster microorganisms that assist in the denitrification process. Biofilm carriers 111 are commercially available in many sizes and typically are made of extruded plastic. In certain embodiments, the individual biofilm carriers are in the range of from about 0.75 to about 2.5 inches in diameter, or more preferably in the range of from about 1-1.5 inches in diameter, and all ranges and subranges therein.

In exemplary embodiments of the invention, biofilm carriers 111 will be made from high density polyethylene (HDPE) as HDPE is slightly buoyant when first introduced into the reactor tanks 104. As the anaerobic bacteria begin to colonize the carriers, thus forming a biofilm thereon, the carriers 111 become more neutrally buoyant and will distribute themselves throughout the vertical water column in the bioreactor vessels 104. In still other embodiments, biofilm carriers 111 will be self-cleaning given the moving nature of the system (e.g. the constant movement of the water up through the vessel allows the carriers 111 to bump into each other, thus self-cleaning and requiring minimal maintenance, less down time for cleaning, and minimizing the loss of bacteria within the filter due to cleaning).

Although not meant to be limiting, examples of suitable biofilm carriers include the commercially available biofilm carriers referred to as Kaldnes K1 or Kaldnes K, which are commercially available from different sources. Other examples include spherical carriers called "bioballs" and sold under the Aquaneat® name, or any other suitable commercially available biofilm carrier elements that can be adapted to grow a denitrifying bacteria consortia thereon for denitrification of a nitrate-contaminated source water. Although a wide variety of configurations are available, the configuration selected should, at a minimum, provide for a suitable water flow through and around the carriers 111, provide a sufficient amount of available surface area for the bacterial biofilm to attach, and result in a net volume in the tank to achieve the desired hydraulic retention time with the bioreactor system 10, as further discussed herein. For example, in embodiments disclosed herein, carriers 111 will have a minimum surface to volume ratio (i.e. effective or specific surface area) of about 152 square feet of exposed surface per cubic foot of media (152 $ft^2/ft^3$ or 500 m2/m3). In other embodiments, carriers 111 will have a surface to volume ratio (i.e. effective or specific surface area) in the range of about 100 to about 260 square feet of exposed surface per cubic foot of media (i.e. 330-870 m2/m3), or preferably in the range of about 129 to about 152 square feet of exposed surface per cubic foot of media (i.e. 420-500 m2/m3), including all ranges and subranges therein (e.g. 100-150, 110-130, 120-152, 150-200, 200-260 $ft^2/ft^3$).

Referring to FIG. 1, external carbon injection system 40 comprises plastic containment tank 101 and metering pump 107. Containment tank 101 contains or houses a biologically available carbon source 50, and metering pump 107 is configured to mix a precise amount of carbon with the incoming wastewater as determined by the needs of the system. In embodiments of the invention, pump 107 can be a peristaltic or other metering pump.

Water source 102 comprises a source of nitrate-containing (or contaminated) waste water, wherein said source is under external pressure or force such that a vertical, upflow is created during operation of the bioreactor vessel 104 when the water enters the unpressurized vessel. For example, in certain embodiments, the external, pressurized water source 102 comprises a pumping system. In other embodiments, the external, pressurized water source 102 comprises a wastewater impoundment system wherein the mobile, small-scale denitrifying bioreactor vessel 104 is operatively installed to produce an elevation difference between the impoundment and bioreactor vessel 104, such that external pressure required for the water source is produced by gravity due to the elevation difference between the water source and the denitrification system. In this way, gravitational forces between water source 102 and bioreactor vessel 104 create an upflow of the source water from the bottom of the bioreactor tank 104 towards the top of the tank, followed by a gravity flow from the top of the tank to discharge point 60.

As shown in FIG. 1, wastewater impoundment system may comprise another plastic water tank or any type of containment vessel or system. While in alternate embodiments, pressurized water source 102 is a well water pressure vessel, or any other pressurized external source of providing nitrate-containing waste water to the system 10. The flow rate through vessel 40 is driven by and dependent on the pressure exerted by the external water source 102. In accordance with certain embodiments, the flow rate moving up through bioreactor vessel 104 is in the range of 2 to 200 gallons per minute (GPM), including all ranges and subranges therein. For example, in some embodiments, a an initial volumetric flow rate (at standard conditions) will be about 2, 3, 4, 5, 8, 10, 15, 25, 50, 100, 150, 180, 200 gallons per minute (GPM), while in practice it will vary and may fall within a given range or subrange (e.g. 2-10 GPM, 8-10 GPM, 2-25 GPM, 5-30 GPM, 10-35 GPM, 26-100 GPM, 50-150 GPM, 100-200 GPM, etc). In embodiments of the invention, the flow rate can be adjusted and can vary depending on the specifications and requirements of the system. By way of example, certain embodiments may comprise a variable frequency drive (VFD) that allows the flow rate of influent 20 to be adjusted and to vary through the system 10. The VFD is programmable and can be controlled by a software program that contains the appropriate interface capability (for example, a 4-20 mA, HART protocol, or Ethernet).

In exemplary embodiments, the height/width ratio of the plastic water tanks are selected to ensure that bioreactor system 10 will target a minimum volumetric flow of at least about 0.3 gallons per minute per square foot ($GPM/ft^2$) of the tank diameter (at standard conditions), or preferably a minimum target of about 0.4 $GPM/ft^2$. In other embodiments, the volumetric flow minute per square foot ($GPM/ft^2$) of the tank diameter will vary over time during operation, but typically will be in the range of about 0.3 to about 2.0 $GPM/ft^2$, or preferably 0.3 to about 1.0 $GPM/ft^2$, including all values, ranges and subranges therein. For example, in certain embodiments, bioreactor system 10 operates with a variable volumetric flow in the range of about 0.3 to 0.4 $GPM/ft^2$, 0.3 to 0.5 $GPM/ft^2$, 0.3 to 0.6 $GPM/ft^2$, 0.4 to 0.6 $GPM/ft^2$, 0.4 to 1.0 $GPM/ft^2$, 0.4 to 2.0 $GPM/ft^2$, or 0.5 to 2.0 $GPM/ft^2$. For example, if the amount of nitrate to be treated decreases in influent 20 over time, the flow rate can be adjusted/increased (for example, doubled) as a shorter retention time in the system is needed.

In embodiments of the invention, influent 20 comprises nitrate-containing water or waste water. By way of example, but not meant to be limiting, influent 20 is irrigation water or agricultural runoff, waste water from a farm, industrial application or small business, water from an oil and gas field operation, or a municipal water source. In accordance with the invention, influent 20 comprises water contaminated with nitrate, wherein the concentration of nitrate will be within the range of about 25-150 mg/L, including all values, ranges and subranges therein. For example, in certain embodiments, the concentration of nitrate will be within the range of about 15-20 mg/L $NO_3$—N, 15-100 mg/L $NO_3$—N, 10-50 mg/L $NO_3$—N, 60-75 mg/L $NO_3$—N, 5-100, mg/L $NO_3$—N, 50-100 mg/L $NO_3$—N, etc.).

In still other embodiments, the concentration of nitrate will be greater than 150 mg/L ($NO_3$—N). This is because, in practice, there is no maximum concentration of nitrates that can be treated via system 10. This is because the system is versatile and low cost enough that it can be adapted to treat high levels of nitrate, in that as the nitrate levels increase, the system can be adjusted by either increasing the residency time in the tanks (e.g. lowering the flow rate) and/or increasing the number of vessels/tanks 104 used in parallel in system 10. Similarly, on the low end, when nitrate levels are substantially zero, the system could be turned off for a period of time and then re-inoculated when it is needed again. Similarly, if the nitrate levels are very low (0.1-10 mg/L or ppm), the flow rate could be minimized in order to reduce the denitrification rate to a low enough level to keep a sufficient enough amount of denitrifying bacteria alive. The versatility of the system, as described above, as compared to large-scale water treatment systems (which are optimized for and require a substantially stead-state system), is in part due to (1) smaller volume sizes of the one or more vessel 104 and (2) the absence of any downstream effluent requirements for system 10.

During operation, influent 20 is introduced into the denitrification system 10 from the pressurized wastewater source 102 to source inlet pipe 109. In embodiments of the invention, although not meant to be limiting, source inlet pipe 109 is an injection tee comprised of PVC pipe or tubing.

Referring to FIG. 1, influent inlet 103 is located substantially at or near the bottom of the bioreactor vessel 104 and is configured to receive the nitrate-contaminated source water (or influent) 20 into a lower portion of said bioreactor vessel 104, wherein said influent inlet 103 is in fluid communication with source inlet pipe 109 which in turn is connected to the external, pressurized water source 102. Metering pump 107 is configured to deliver carbon nutrient source 50 from tank 101 to source inlet pipe 109 where the waste water influent 20 and the carbon source 50 mix and flow into the bottom or substantially at or near the bottom of vessel 104 at influent inlet 103. A sufficient amount of carbon nutrient source 50 is fed to the bioreactor to support and complete the biological denitrification process and to maintain the proper ratio range of carbon:nitrogen:phosphorus in order for the denitrifying bacteria to thrive.

After passing through source inlet pipe 109 into vessel 104, the water to be treated, containing an aqueous mixture of nitrate-containing influent 20 and nutrient source 50, flows through an injector assembly 108. More specifically, in embodiments of the invention, influent inlet 109 is in fluid connection with injector assembly 108, and injector assembly 108 is configured to introduce the source water and carbon source into the bioreactor vessel 104. As described in more detail in connection with FIG. 2, injector assembly 108 is configured and optimized to disperse the injected water evenly across the bottom of the vessel 104 to reduce channeling and provide optimal distribution of the nitrate-contaminated source water throughout the bioreactor vessel 104.

The wastewater and carbon then flow up through the bioreactor tower 104 and biofilm carriers 111. Referring to FIG. 1, a drain (or discharge) assembly 110 is located substantially at or near a top of the bioreactor vessel 104, at or substantially just below the surface of the water within the tank.

Drain assembly 110 is fluidically connected and configured to be in communication with a discharge port 70, which in turn is fluidically connected and configured to be in communication with an external discharge point 60. Drain assembly 110 is operably configured to discharge denitrified water from the top of said bioreactor vessel to the discharge point 60, such that a vertical, upflow is created during operation of the bioreactor system 10.

In operation, the treated, denitrified wastewater, or effluent 30, exits the bioreactor vessel 104 through drain assembly 110, and out of the tank via gravity drain 106, which is in fluid communication with discharge point 60. In embodiments of the invention, although not meant to be limiting, discharge point 60 can be a second water treatment system (e.g. filtration system), a bioremediation lagoon, the groundwater, a surface discharge, a well, a point-of use, or a municipal water source. In embodiments of the invention, the effluent 30 will have a nitrate concentration below 10 mg/L In still other embodiments, the nitrate removal will be in the range of about 95-99% of the initial nitrate concentration of influent 20. In still other embodiments, the amount of nitrate removed will be in the range of about 50-99.9% of the initial nitrate concentration, including all ranges and subranges there, depending on the nature of discharge point 60. For example, the amount of nitrate that can remain in effluent 30 will depend on whether effluent 30 is intended to be discharged into the groundwater, into a point of use system, or into a second post-denitrification system (i.e. bioremediation containment, which would require that less nitrate would need to be removed by system 10).

Referring again to FIG. 1, in the embodiment shown here, manway 105 is configured to release air from vessel 104. In this way, carbon dioxide and nitrogen gas generated during the bacteria respiration are vented through the manway 105, along with air. In this way, vessel 104 remains unpressurized, thus allowing vessel 104 to comprise a plastic water storage tank. One of ordinary skill in the art will recognize that in certain embodiments other venting means, for example a manual air bleed valve or other venting mechanism, that can be configured to sufficiently vent vessel 104 in order to avoid pressurization within the vessel could be used as venting means and still remain within the scope of the invention.

Figure 2:
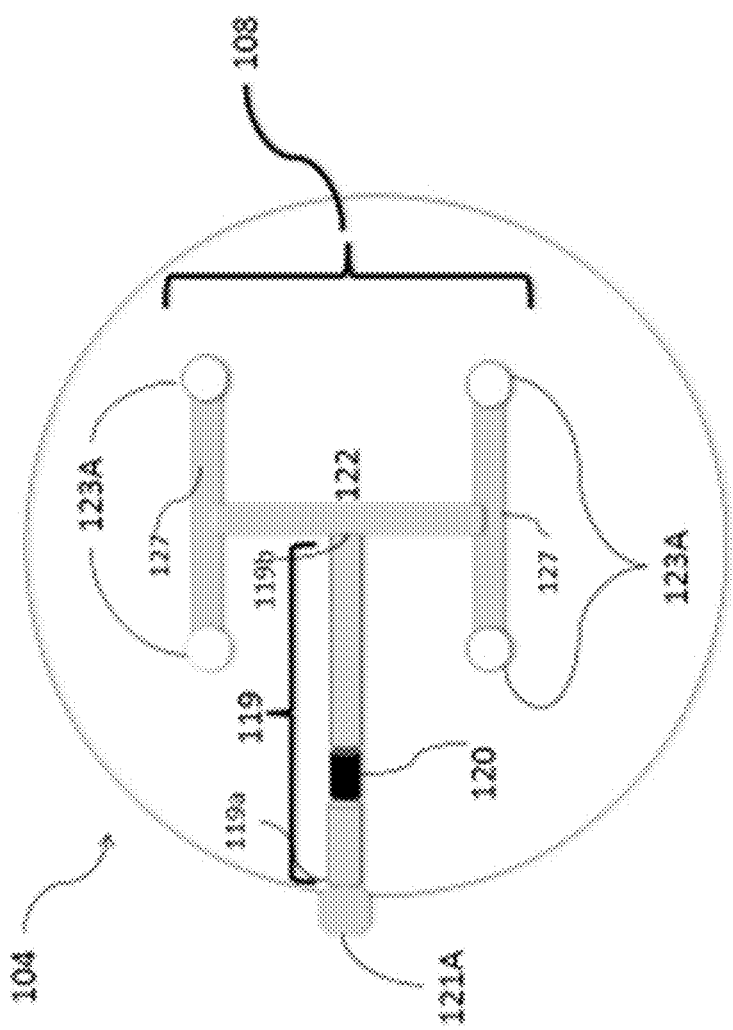
FIG. 2 is a cross-sectional top plan view of the inside of a bioreactor vessel in accordance with certain embodiments of the invention showing the injector assembly.

As indicated above, and referring to FIG. 2, in embodiments of the invention bioreactor vessel 104 includes injector assembly 108 and drain assembly 110. Injector assembly 108 and drain assembly 110 are fixedly secured to the wall of vessel 104 via bulkhead connectors 121 installed at (or substantially near) the bottom and top of the housing of the tank. In a nominal configuration, bulkhead connectors 121 are approximately 2 inches in diameter with internal threads as securing means.

FIG. 2 shows a cross-sectional top plan inside view of vessel 104, illustrating a top plan schematic view of injector assembly 108 inside the plastic water tank (i.e. vessel) 104. In the embodiment shown here, the injector assembly 108 connects to the wall of the tank via threaded bulkhead connector 121. In operation, Injector assembly 108 functions to distribute and disperse the source water evenly across the bottom of the vessel 104 to reduce channeling and provide optimal distribution of the nitrate-contaminated source water throughout the bioreactor vessel 104. In contrast, if water is injected directly into bulkhead 121 at the bottom of the tank, good mixing will not occur.

Injector assembly 108 comprises a horizontally-disposed H-shaped assembly created by (1) a horizontally-disposed inlet conduit or pipe 119, having a proximal end (119a) and a distal end (119b); (2) a horizontally-disposed center stem pipe 122 having a first and second end (1220); and (3) two (i.e. a first and second) horizontally-disposed transverse pipes 127, each having a first and second terminal end (121a,b). In exemplary embodiments, although not meant to be limiting, conduit 119, center stem pipe 122 and transverse pipes 127 are constructed from PVC pipes or tubing, or other light weight material.

The proximal end (119a) of inlet conduit 119 is adapted to be fluidically connected to the external pressurized water source 102 via source inlet pipe 109, while the distal end (119b) of the horizontally disposed inlet conduit is fluidically connected to a center portion (122c) of center step pipe 122. The first and second ends (122a,b) of center pipe 122 are fluidically connected to a center portion (121c) of the first and second transverse pipes 127, in such a way that center stem pipe 122 and the first and second transverse pipes 127 are operably and optimally configured to define an H-junction, as shown in FIG. 2. In still other embodiments, center stem pipe 122 and the first and second transverse pipes 127 are operably and optimally configured to define one or more T-junctions, or similar shapes.

Referring to FIG. 2, in certain embodiments, inlet conduit 119 comprises a first piece or section of PVC pipe that is removably secured to and in communication with bulkhead 121 at one end, and at the other end is removably secured to a flexible rubber coupling 120 via securing means known in the art. For example, in certain embodiments, coupling 120 is removably secured with hose clamps, but other known means of removably securing can be used. Inlet conduit 119 further comprises a second piece or section of PVC pipe that is removably secured one end to coupling 120, and at the other end is removably secured to and fluidically connected to the center portion (122c) of center step pipe 122, the combination of which forms a T-shape junction or similar shape.

First and second transverse pipes 127 have multiple injection points 123 located at each of the terminal ends (127a,b), wherein injection points 123 are operatively configured to distribute and disperse source water into tank 104. In embodiments of the invention, injection points 123 are perforated PVC plastic end caps with perforations or holes (e.g. machined/drilled holes) which allow the water to spread across the bottom of the tank. In operation, the source water (under pressure) flows from source inlet pipe 109 via influent inlet 103 through conduit 119, then center stem pipe 122 and then transverse pipes 127, and is dispersed out through injection points 123. In this way, injector assembly 108 is configured to define an H-shaped perforated in assembly.

Figure 3:
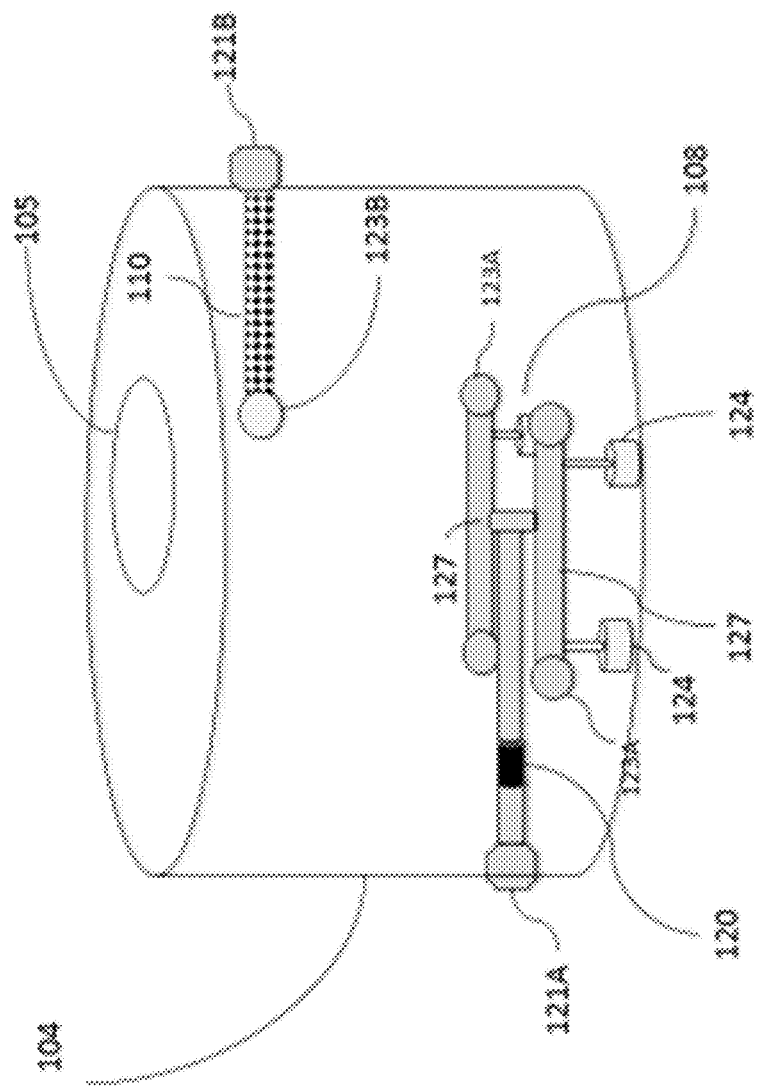
FIG. 3 is a profile-view of the inside of a bioreactor vessel in accordance with certain embodiments of the invention.

In embodiments of the invention, injector assembly 108 also includes structural supports 124 operatively configured to support the weight of injector assembly 108 and thus minimize or eliminate, leakage from bulkhead 121. As shown in FIG. 3, structural supports 124 are secured to transverse pipes 127 by securing means known in the art (e.g. clamping, u-clips, etc.).

By way of example, in certain embodiments, structural supports 124 comprise a plurality of adjustable feet removably secured to transverse pipes (or arms) 127. The adjustable feet are padded on the bottom with a threaded bolt through the middle. The threaded bolt is then threaded through a standard PVC pipe hanger and can be adjusted. Together with coupling 120, structural supports 124 minimize the stress or forces exerted on the connection found at the bulkhead connector 121 that is in fluidic communication with the injector assembly 108, and allows injector assembly 108 to move slightly during operation. While reference is made to adjustable feet herein, structural supports 124 may comprise other forms of support for the components of injector assembly 108. By way of example only, structural supports 124 may comprise other types of pipe adjustable fasteners, adjustable pipe supports, adjustable floor supports, u-bolts, or adjustable height mounts, with or without padding.

Referring to FIGS. 1 and 3, once the source water is treated and reaches the top of the vessel 104, the treated, denitrified water passes through drain assembly 110, and exits discharge points 123B as effluent 30 via gravity drain 106. In embodiments of the invention, drain assembly 110 a perforated PVC pipe removably secured to the inside part of the bulkhead connector 121B via threads. In a nominal configuration, bulkhead connectors 121A-B are approximately 2 inches in diameter. As such, the biofilm carriers 111 are small enough to move through either the bottom and/or top bulkhead connectors 121A-B, and out of the tank. By providing perforated PVC caps at injection points 123A and discharge points 123B, the system prevents the biofilm carriers 111 from exiting the tank with the effluent 30.

In exemplary embodiments of the invention, the hydraulic retention time in bioreactor vessel 104 is less than two (2) hours. More specifically, the hydraulic retention time is approximately 90 minutes, or in the range of 90-120 minutes (i.e. less than 2 hours). In alternate embodiments of the invention, the hydraulic retention time ranges from 60-200 minutes, including all ranges and subranges therein (e.g. 60-100, 60-120, 60-180, 80-140, 90-150, 90-180, 90-200 minutes). For example, in some embodiments, the hydraulic retention time will be about 60, 70, 80, 90, 95, 100, 120, 150, 180, or 200 minutes. By way of example only, a system with an average flow rate of 25 gallon per minute (GPM) system would preferably utilize one or more plastic water tanks with a net volume of 3000 gallons (where net volume=volume of the one or more tanks minus the effective volume of the biofilm carriers) to achieve a hydraulic retention time of 120 minutes.

In exemplary embodiments of the invention, the nitrate removal coefficient is calculated while system 10 is at steady state. Specifically, the inlet and outlet concentration of nitrate are measured at influent inlet 103 and discharge port 70, and the change or concentration reduction is calculated. The volume of biofilm carriers 111 is measured during installation by counting the bags of carriers added to the vessel 104. The flow rate of water through the system is also measured. The coefficient can then be calculated by the following equation:

Nitrate reduction coefficient=[Flow rate (gallons/day)×Concentration Reduction pounds of nitrate/Gallon)]/volume of biofilm carriers (gallons).

In accordance with methods known in the art, this coefficient can be used to size or scale the bioreactor system 10 (e.g. by adjusting the volume of biofilm carriers, size and number of water tanks used in the system, and/or by adjusting the flow rate/hydraulic retention time).

Other parameters that need should be controlled within system 10 include the dissolved oxygen (DO) levels, pH, and the carbon:nitrogen:phosphorus ratios must be kept in the proper range for the bacteria to thrive. More specifically, in embodiments of the invention, pH conditions must kept within a range of about 6.5 to about 7.5 within the reactors, including all values, ranges and subranges therein (e.g. 6.6, 6.7, 6.8, 7.0, 7.1, 7.2, 7.3, 7.4).

The biological breakdown of nitrate in bioreactor system 10 via bacterial respiration of nitrate produces a nitrogen gas product. The source water stream preferably flows upward in a vertical column through vessel 104 at a flow rate sufficient to carry the resulting nitrogen gas bubbles to the top of vessel 104. However, the source water stream also preferably travels through vessel 104 at a flow rate slow enough to provide a sufficiently-long retention time to reduce and/or eliminate the nitrate in the source water and to prevent significant amounts of biomass from being removed from the biofilm carriers 111 and carried to the top of the vessel 104 and the upper surface of the water contained therein. Upon reaching the upper water surface, the nitrogen gas bubbles are vented/released to the atmosphere through the open top of bioreactor vessel 104 (i.e. through manway 105).

In embodiments of the invention, the denitrification system and process is monitored via one or more monitoring devices 98, wherein the monitoring device 98 may comprise one or more meters, sensors or other monitoring devices known in the art. For example, in embodiments disclosed herein, monitoring device 98 comprise both a handheld, continuous oxidation-reduction potential (ORP) instrument and nitrate test strips, both known in the art. The ORP instrument (or meter) can be located at any location inside the bioreactor tank 104 or in the gravity discharge line 106 (e.g. see FIG. 1). For example, in certain embodiments, an ORP meter is placed about 1 foot below the perforated drain assembly 110 on the inside wall of the tank.

The oxidation reduction potential will vary based on the site, location and source water. The operator periodically checks the outflow (e.g. effluent 30) of the bioreactor system with ORP meter. The operator can take samples of effluent 30 from inside vessel 104 and/or gravity drain 106 periodically and use nitrate test strips and other handheld instruments to monitor effluent 30. Based on the results, the operator can then manually or automatically (using system controls discussed below) adjust pump 107 to achieve the desired ORP range in the effluent 30 at the discharge outlet. In order to ensure efficient denitrification within the system, an ORP value of −50 to +50 mV is targeted, and the parameters of the system (e.g. flow rate, carbon source loading etc.) can be adjusted to achieve an ORP value within this range. This step/measurement provides for a dynamic and versatile system, in that the amount of carbon source injected into the system will vary and be dependent on the amount of nitrate entering the system.

In embodiments of the invention, due to anoxic conditions preferably maintained in the denitrification system 10, the microorganisms present on the biofilm carriers will respire nitrates present in the influent 20 since there is no oxygen present. As indicated above, in exemplary embodiments of the invention, the upflow, anaerobic, denitrification system 10 further includes a carbon source 50 to allow the anaerobic microorganisms present on the biofilm carriers 111 to efficiently and fully remove the nitrates from the influent 20. During operation, the microorganisms will utilize the nitrates present in the influent 20 as an electron acceptor when consuming the carbon source. The carbon source will act as an electron donor, causing reduction of the nitrates. This process will result in nitrogen gas ($N_2$) being formed thereby eliminating the nitrate and any other nitrogen species that may be present ($NH_3$—N, $NO_2$—N).

In embodiments of the invention, carbon nutrient source 50 comprises an aqueous mixture of nutrients selected from the group comprising a carbohydrate, an alcohol, or combinations of the same. While various carbon sources may be utilized, in exemplary embodiments methanol will be used as carbon source 50. In still other embodiments, ethanol or acetate may also be used as the carbon source. Methanol and ethanol are typically more rapidly metabolized by the denitrification bacteria and are therefore preferred for use in denitrification system 10. Other examples of suitable carbon source include carbohydrates and/or other alcohols, such as glucose, sugar, corn syrup, cellulose, galactose, maltose, fructose, saccharides, ethylene glycol, glycerol/glycerin, and combinations thereof.

In embodiments of the invention, the amount of carbon nutrient material added to the source water will be an amount effective to achieve a total nitrate concentration in effluent 30 not exceeding 10 mg/L. In still other embodiments, the target nitrate concentration in effluent 30 may be higher, if a second post-denitrification system is utilized. The amount of carbon source suitable for a specific system will be determined in advance, prior to the system start up, and can then be adjusted as the nitrate concentration in the source water entering the denitrification system varies with time. By way of example only, in certain embodiments, the concentration of carbon source introduced into system 10 for the initial dosing will be in the range of about 6 to 7 units of carbon per 1 unit of nitrate-nitrogen. In still other embodiments, the concentration of carbon source will be in the range of about 5 to 8 units of carbon per 1 unit of nitrate-nitrogen, including all ranges and subranges therein (e.g. 5, 5.4, 5.9, 6.0, 6.5, 6.9, 7.0, 7.1, 7.3, 7.5, 7.7, 8.0).

By way of example only and not meant to be limiting, MicroC®, a commercial form of crude glycerin, has a recommended dosage of about 0.7 gallons/pound of nitrate removed. Other carbon sources can be estimated by knowing the chemical oxygen demand (COD) of the carbon source. In exemplary embodiments of the invention, the system will utilize a target ratio of carbon source per gram of Nitrogen ($N_2$) equal to about 7.6. For example, the COD of glycerin is 1.06 grams of oxygen ($O_2$) per gram of glycerin. Using the target ratio of 7.6, the amount of carbon source added should be equivalent to about 6.6 grams of glycerin/gram nitrate removed. Furthermore, since crude glycerin from a biorefinery is often 85% glycerin, the actual glycerin flow rate should be about 6.6/0.85 grams of glycerin per gram of nitrate removed, which is equivalent to about 7.7 grams of glycerin per gram of nitrate removed. This same calculation process can be used for acetate, methanol, ethanol, and other carbon sources.

In accordance with the invention, in certain embodiments, an appropriate amount of phosphorus may need to be added to system 10 in order to grow the denitrification bacteria and/or maintain the proper nutrient/carbon-nitrogen-phosphorus ratio. However, in still other embodiments, the addition of phosphorous will not be necessary because it is often already present in agricultural surface wastewater streams. By way of example only, in certain embodiments, the nitrogen:phosphorus ratio will be about 25:1. In operation, this generally will result in phosphorus being introduced into system 10 in the concentration range of about 1-10 mg/L in the influent.

In embodiments disclosed herein, system 10 also includes a source of one or more denitrifying bacteria. The denitrification bacteria used are preferably naturally occurring, can denitrify high levels of nitrate, and are resistant to high levels of nitrate, TDSs, inorganic and organic chemicals. As disclosed herein, the bacteria preferably (although not required) are a specially-isolated bacterial consortia with relatively low sensitivity to high nitrate levels and which are isolated from a source close to or within the nitrate-contaminated source water.

For example, in embodiments herein, the bacteria will be obtained from ponds or drainage ditches that are chronically exposed to elevated nitrate levels (i.e. have high levels of nitrate). Other sources include groundwater, surface water, runoff, irrigation water, or combinations of the same.

In other embodiments, although not required, the source of denitrifying bacteria will be isolated from a local source close to where system 10 will be installed and/or obtained from the source water to be treated itself. This is because, the inventor has found that bacteria isolated from local agricultural water sources tends to be more resistant to inorganic and organic chemicals that may be present in agricultural tailwater or well water drawn from or near agricultural operations. In accordance with methods disclosed herein, a suitable inoculum will be obtained from one of these locations, and a source of denitrifying bacteria for system 10 will be isolated therefrom.

In embodiments of the invention, system 10 targets the bacteria *pseudomonas stutzeri* (*P. stutzeri*) as the preferred microorganisms. The original techniques for isolating *P. stutzeri* as an example, are described by van Iterson (1902) and Van Niel and Allen (1952). The entire disclosure of each of these references is incorporated herein by reference. The isolation techniques described therein and utilized in embodiments of the invention do not require any specialized equipment or laboratory and use only common ingredients.

*Pseudomonas* are part of a diverse group of bacteria called chemoheterotrophs, and they are facultative (e.g. they will use oxygen for respiration when available and nitrate when oxygen is not available). While other facultative, denitrifying bacteria may be targeted by system 10 and still remain in the scope of this disclosure, by virtue of isolating *P. stutzeri*, it has been discovered that these *pseudomonas* bacteria are highly suitable as agents to denitrify nitrate-containing water in the small-scale, mobile bioreactors, even at high levels of nitrate.

In general, the presence of total dissolved solids (TDS) in the source water has little to no effect on bioreactor system 10, provided the system is inoculated (or seeded) with local anaerobic or facultative denitrifying bacteria. Furthermore, as long as sulfur compounds, like sulphate, found in the source water do no exceed the Federal standard of 250 mg/L, sulfur-reducing bacteria will not thrive, and the nitrate reducing bacteria will generally out-compete the sulfur reducing bacteria for any available carbon substrate.

Similarly, in exemplary embodiments illustrated herein, system 10 does not require an oxygen-removal device, apparatus or method to deplete the source water of oxygen in order for it to work successfully. For example, in certain embodiments, oxygen is likely consumed while in the supply tank by any number of aerobic bacteria that are present in the source water. In still other embodiments, the source water is characterized as anoxic prior to entering bioreactor vessel 104 (for example, when the source water comprises ground water or well water, and thus there is no interface to the atmosphere prior to entering the bioreactor). Although not required, one of ordinary skill in the art will recognize that, in certain embodiments, a system or device for removing oxygen from the system may be included and still remain in the scope of the invention as intended.

In exemplary embodiments herein, and as distinguished from and beneficial over prior art technologies, construction of the modular denitrification system 10 disclosed herein is simple, and requires only hand tools and a suitable space. The system is modular and completely mobile. The water tanks, pipes/tubing, fittings, valves, biofilm carriers, and other materials can be purchased from various commercial sources. Furthermore, and in accordance with embodiments of the invention, bioreactor system 10, in its entirety, can be assembled on site using only two people and hand tools known in the art. Site preparation will include a foundation and/or stabilizing means for system 10. In certain embodiments, the foundation or stabilizing means comprise a small concrete pad (about 150 square feet for a 25 GPM system), a prepared gravel foundation or other foundations or stabilizing means known in the art.

To provide for a portable or mobile bioreactor system, in embodiments herein, the system uses simple, widely available and small-scale components (e.g. short tubing and/or pipes, quick disconnects, etc.). Similarly, the system will be utilize and comprise structural elements made substantially of a plastic or other light weight material.

In transporting the modular system, certain steps are taken before the system can be moved from one site to another. First, all water is drained out of the one or more plastic water tanks that make up bioreactor vessel 104. Second, the tanks are loaded onto a flatbed truck. Third, the tanks are transported to a second site. Fourth, a foundation is provided at the second site. And, fifth, the tanks are placed on the foundation at the second site. As described in more detail below, a control system for the bioreactor may comprise a simple timer with switchable AC outlets for the metering pump and wastewater source, which is readily portable as well and simple to install at the second site.

Figure 4:
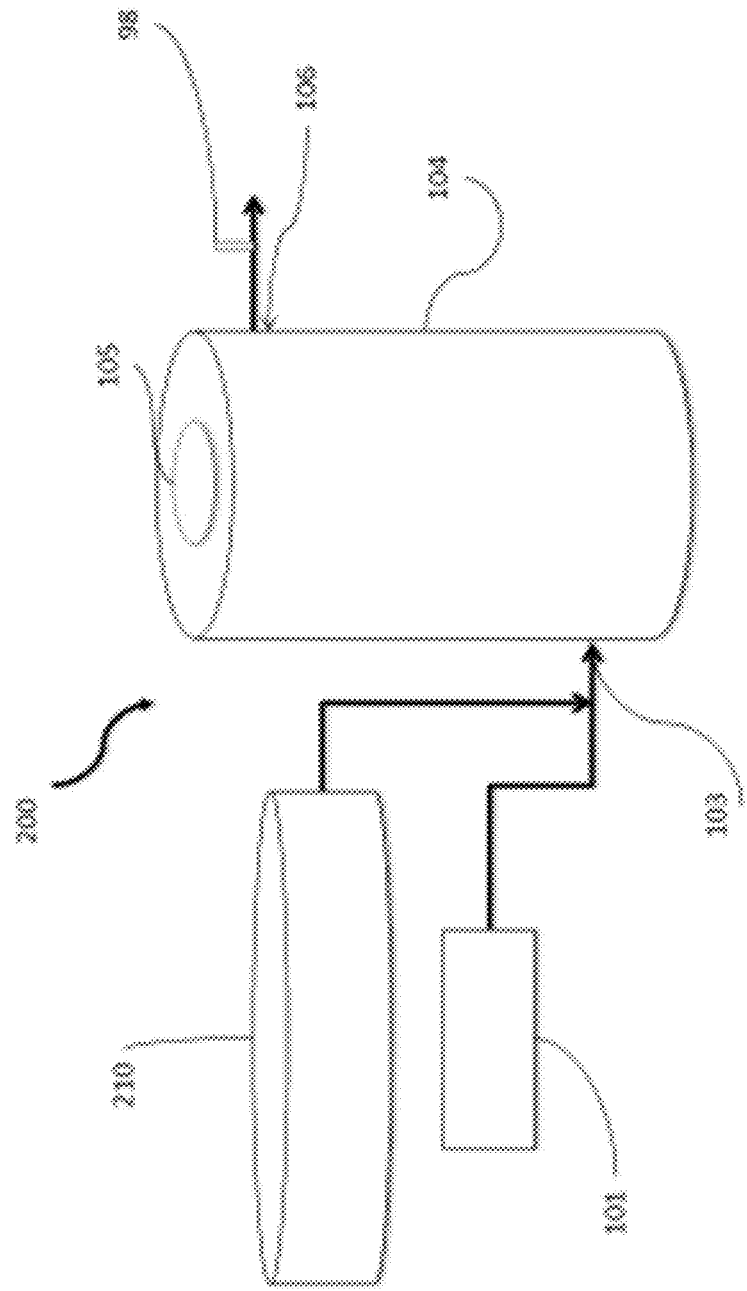
FIG. 4 is a schematic diagram of an up-flow denitrification system used in series with a bioremediation containment in accordance with certain embodiments of the invention.

Referring to FIG. 4, an alternate embodiment of system 10 is illustrated. In this embodiment, system 200 comprises the bioreactor system from FIG. 1 combined with an existing wastewater impoundment 210. By way of example, wastewater impoundment 210 may be a holding pond, a storage basin, or any other type of man-made or natural impoundment for contaminated wastewater or tailwater. In this embodiment, for example, the bioreactor vessel 104 is located at an elevation slightly below an existing wastewater impoundment 210. Impoundment 210 provides the external, static pressure (i.e. the external pressure source) to force the nitrate-containing water to flow up through the one or more bioreactor vessels 104. Denitrified water exits via gravity drain 106 into any discharge point 60 (not shown) that is lower than the elevation of the water in impoundment 210.

In this embodiment, impoundment 210 also acts as a pre-treatment system. Depending on the elevations available, the one or more bioreactor towers 104 can be placed above grade or below grade. The advantage of system 200 is that it simplifies the operation and reduces the cost of the system to the owner.

Figure 5:
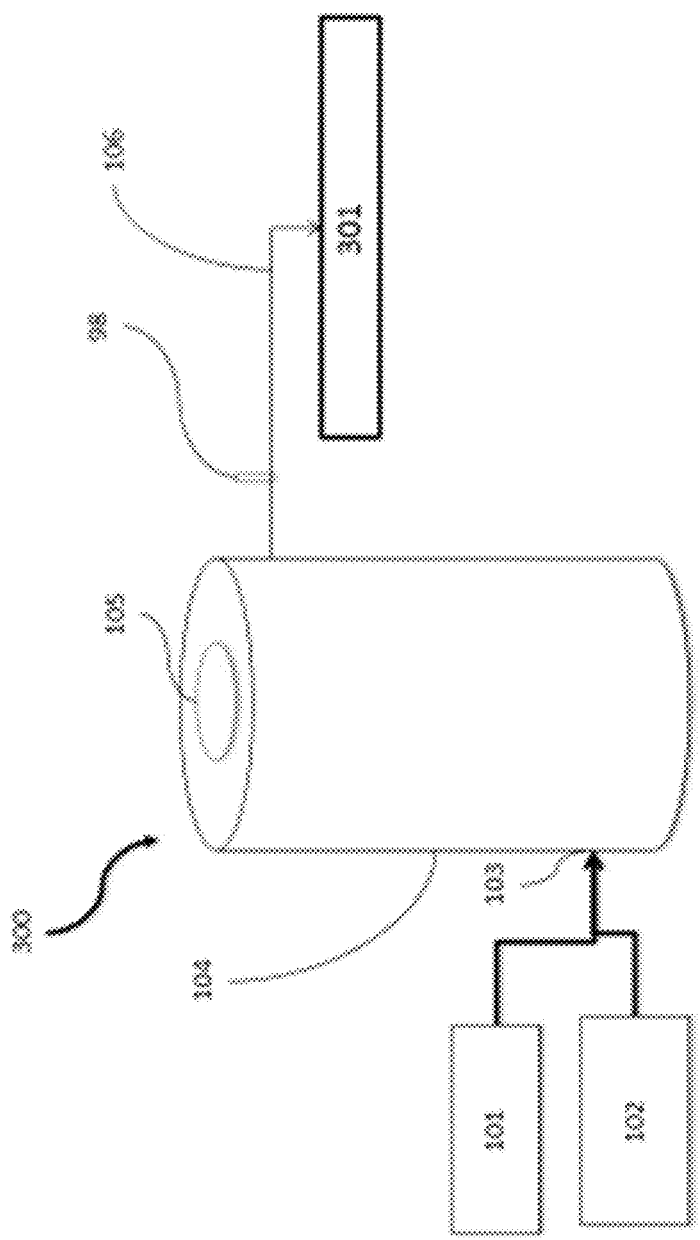
FIG. 5 is a schematic diagram of an up-flow denitrification system used in series with a wetland containment system in accordance with certain embodiments of the invention.

Referring to FIG. 5, an alternate embodiment of system 10 is illustrated. In this embodiment, system 300 comprises the bioreactor system from FIG. 1 combined with a new or existing bioremediation system 301. For example, bioremediation system 301 may be a new or existing wetland, holding pond, or other type of bioremediation or phytoremediation facility. In this embodiment, the one or more bioreactor vessel 104 is located at the headworks of the proposed or existing bioremediation system 301. The one or more bioreactor vessel 104 receives, for example, agricultural drainage or other nitrate-contaminated water as the pressurized wastewater source 102. Pressurized wastewater source 102 enters the bioreactor vessel 104 and is mixed with the carbon source 50 at influent inlet 103, and then the water to be treated moves up through the bioreactor, removing a majority of the nitrate quickly and efficiently. The treated water exits the vessel 104 via the gravity drain 106, which is connected to the headworks of a wetland or other type of bioremediation facility 301. The treated, denitrified water then flows into the bioremediation facility 301 where it is further treated via naturally occurring bacteria and sediment settling.

As such, in this embodiment, the one or more bioreactor vessel 104 does not need to remove all of the nitrate. Most of the remaining nitrate will be consumed by bioremediation system 301. By adding the denitrification capacity of the bioremediation system 301, the cost of operating the bioreactor vessels 104 is reduced to the farmer.

This embodiment also overcomes problems that may occur when a bioremediation system 301, such as a wetland, cannot sufficiently treat water with high levels of nitrate due to an insufficient levels of carbon within the system 301. More specifically, since the bioreactor 104 in this embodiment also uses a liquid carbon source 50, there is no need for a post treatment system to remove excess carbon that might leave the bioreactor tower 104. Instead, any excess carbon that is discharged from vessel 104 can flow directly to the bioremediation system 301 (i.e. wetland), thus enhancing its nitrate removal capability and allowing it to treat waters with high levels of nitrate.

Figure 6:
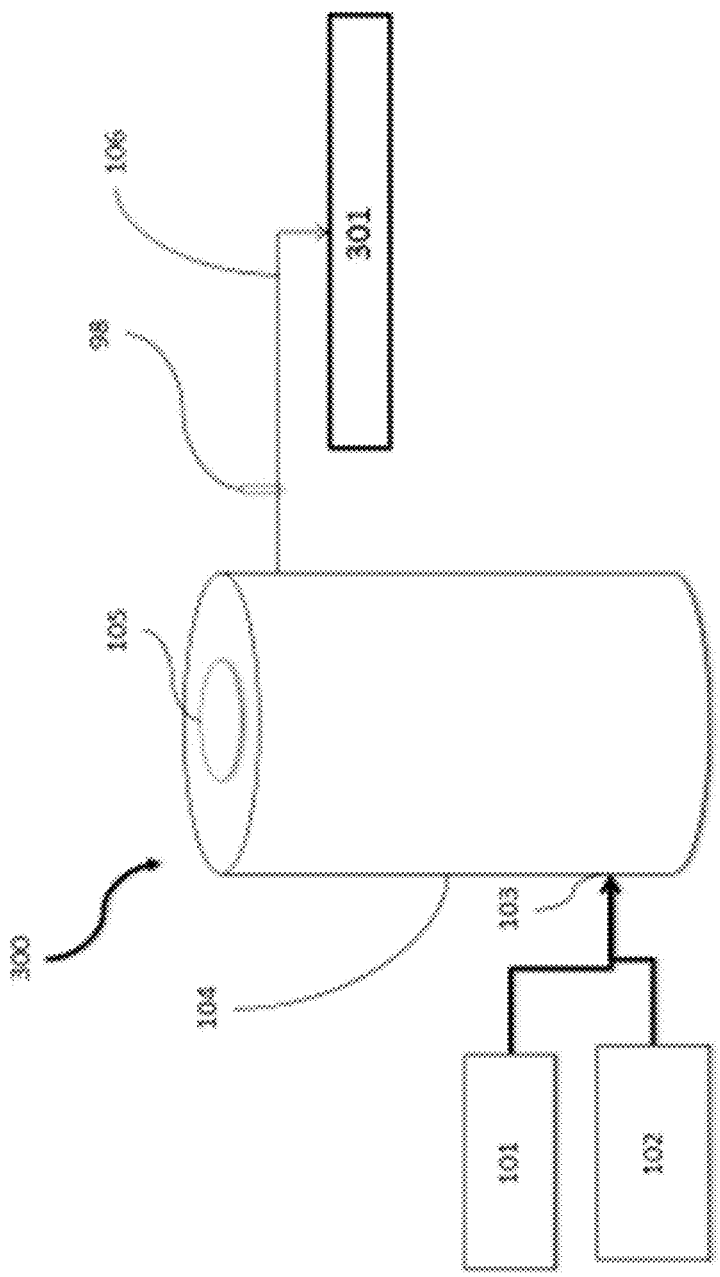
FIG. 6 is a schematic diagram of an alternate embodiment of an up-flow denitrification system in accordance with certain embodiments of the invention, installed at a sample ground and ground water contamination site.

Referring to FIG. 6, an alternate embodiment of system 10 is illustrated. In this embodiment, system 400 comprises the bioreactor system from FIG. 1 combined with a pump-treat-return system. More specifically, in this embodiment, system 400 uses existing contaminated wells as the pressurized water source. Bioreactor vessel 104 is connected to a powered, well head 402 (or well pump) of an existing well and well head 402 pumps nitrate-contaminated well water from ground aquifer 403 up through the bioreactor vessel 104. The denitrified water leaving the bioreactor vessel 104 is returned to the aquifer 403 via injection or other method.

In certain embodiments, as shown for example in FIG. 6, system 400 is powered by a set of solar panels 401 in order to reduce operating costs. Since most groundwater nitrate concentrate concentrations are stable over short periods of time from weeks to years, these systems could operate in a similar fashion to pump-jacks in the oil industry. These so-called "nitrate jacks" could be operated continuously and be monitored remotely with any number of wireless communication technologies. The operating cost would be limited to the carbon supply and routine maintenance.

Figure 7:
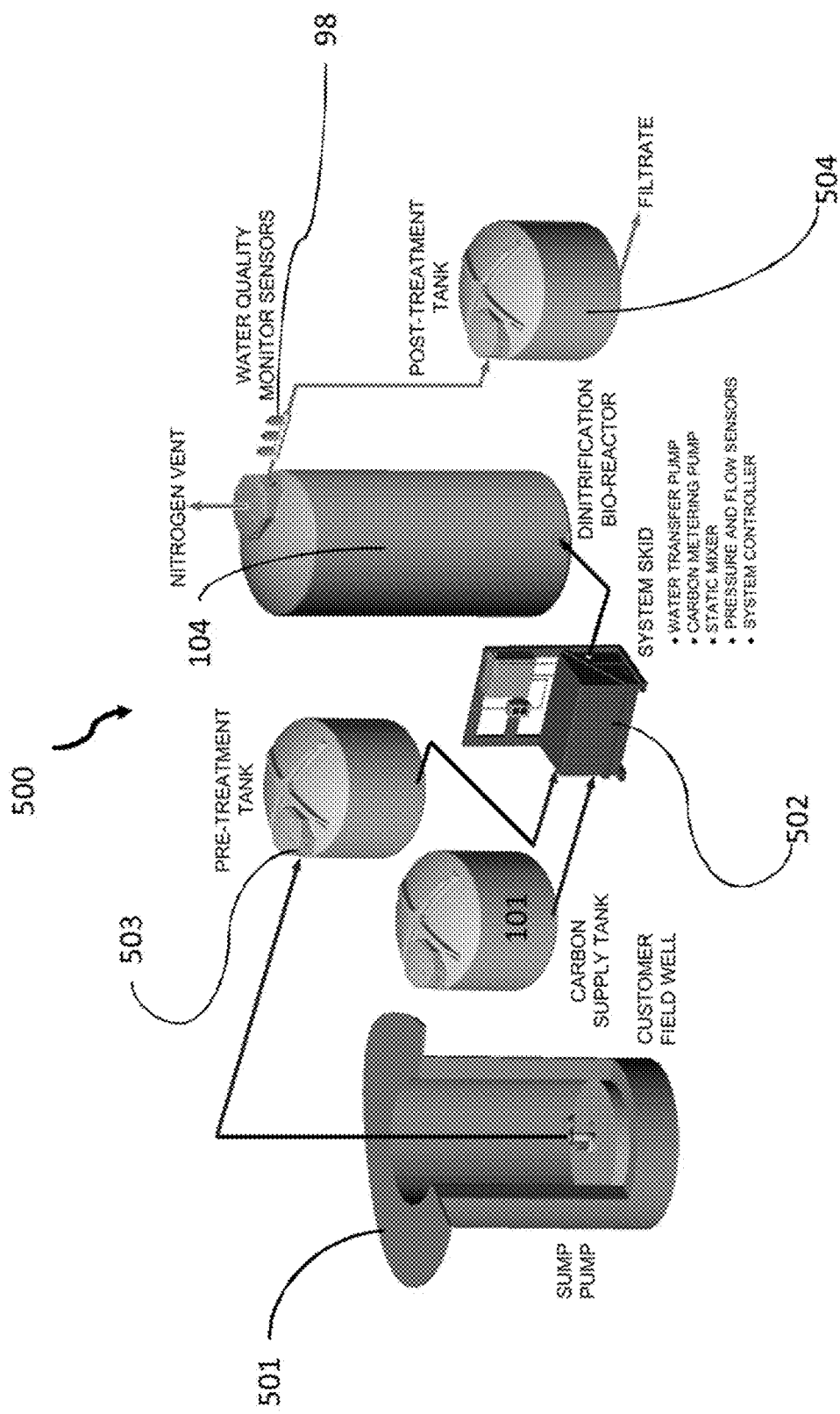
FIG. 7 is a schematic diagram of an alternate embodiment of an up-flow denitrification system in accordance with certain embodiments of the invention.
Figure 8:
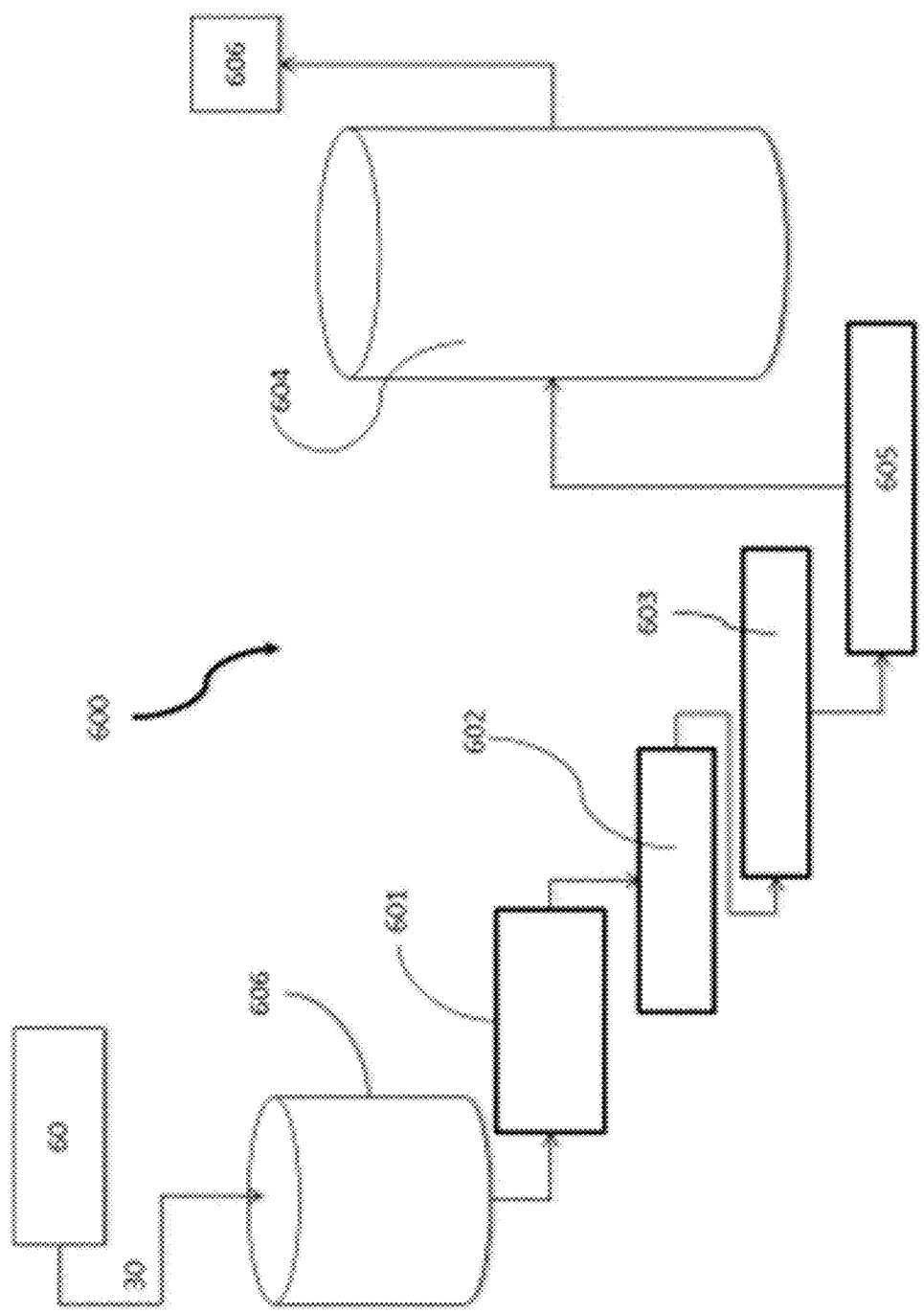
FIG. 8 is a schematic diagram of an alternate embodiment of an up-flow denitrification system in accordance with certain embodiments of the invention.

Referring to FIG. 7, an alternate embodiment of system 10 is illustrated. In this embodiment, system 500 comprises the bioreactor system from FIG. 1 combined with a series of subsystems to create a robust and fully automated system for treating wastewater from, for example, agricultural fields. More specifically, system 500 comprises the following subsystems: a) pretreatment subsystem or tank 503; b) carbon supply system 101; c) one or more vertical "upflow" bioreactor towers 104 partially filled with biofilm carriers; d) an electronic control system 502; and, optionally, (e) a post treatment subsystem or tank 504. This embodiment is best suited for higher flow rates (e.g. in the range of about 10 to 200 gallons per minute) and a fully automated operation.

In embodiments illustrated herein, pressurized water is pumped via an existing tile drain sump pump 501 (or, for example, a submersible pump) into a pretreatment subsystem 503. Pretreatment subsystem 503 comprises one or more wastewater pretreatment methods or apparatus known in the art. For example, in one embodiment, the source water is pretreated to remove sediment using a simple, passive solid-liquid separator. Pretreatment subsystem 503 also serves to provide constant pressure to system skid 502 which contains the pumps for feeding bioreactor 104 and for supplying carbon from tank 201.

For periodic, non-uniform flows, such as a tile drain sump pump or submersible pump, a holding tank can be used to capture and hold the raw incoming wastewater (i.e. nitrate-containing source water) and provide a constant pressure head to the one or more bioreactor tower 104. The pretreatment subsystem 503 may also provide static head pressure.

The control system 502 includes a redox (ORP) sensor 105, and optionally other water quality monitors (e.g. pH monitor) on or near the output of the bioreactor vessel 104 to adjust the injection of liquid carbon into the bottom of the reactor vessel in accordance with the disclosure herein to assure proper conditions in the bioreactor. Furthermore, in certain embodiments, float valves (not shown) control the level of water in the bioreactor vessel 104. A wireless communication system enables remote monitoring and control over the operation of the system.

A post treatment subsystem 504 can be used to further treat the denitrified water that exits the bioreactor vessel 104. For example, in certain embodiments, post treatment subsystem 504 is a carbon filtration device configured to remove any organic matter or adsorb unwanted organic contaminants such as pesticides.

As discussed above, in certain embodiments, the denitrifying bioreactor systems described herein can be coupled with existing point-of-entry (POE) water treatment systems to provide drinking water from nitrate-contaminated wells. By way of example, and referring to FIG. 8, an alternate embodiment of the anaerobic, denitrification system 10 is illustrated. In this embodiment, drinking water system 600 comprises bioreactor 104 from FIG. 1 as the first stage in a small drinking water system. The bioreactor vessel 104 (first stage) is followed by a downflow, aerobic roughing filter 606 to move dissolved organic carbon and any biomass from the denitrified effluent 30 that flows out the gravity drain (i.e. the top of the water tank) in bioreactor system 10. Water discharged from the outlet of the roughing filter 606 is pumped via repressurization pump 601 through a conventional multistep step water treatment (or purification) system known in the art (e.g., sedimentation filters 602, followed by UV sterilization 603, and activated carbon 605). The treated, denitrified drinking water can then be transferred to and stored in a large plastic tank 604 to accommodate daily use via a point-of-use output 606.

In embodiments of the invention, the denitrification bioreactor system is operated on a limited or reduced duty cycle, such that drinking water system 600 can be operated at night so that during the start of the work day, the treated water supply tank 604 is full. This is advantageous in that, since the water is allowed to "sit" in the bioreactor columns overnight, all of the nitrate will disappear; thus this system can essentially do the same thing as on-demand filtration (RO) can do.

Figure 9:
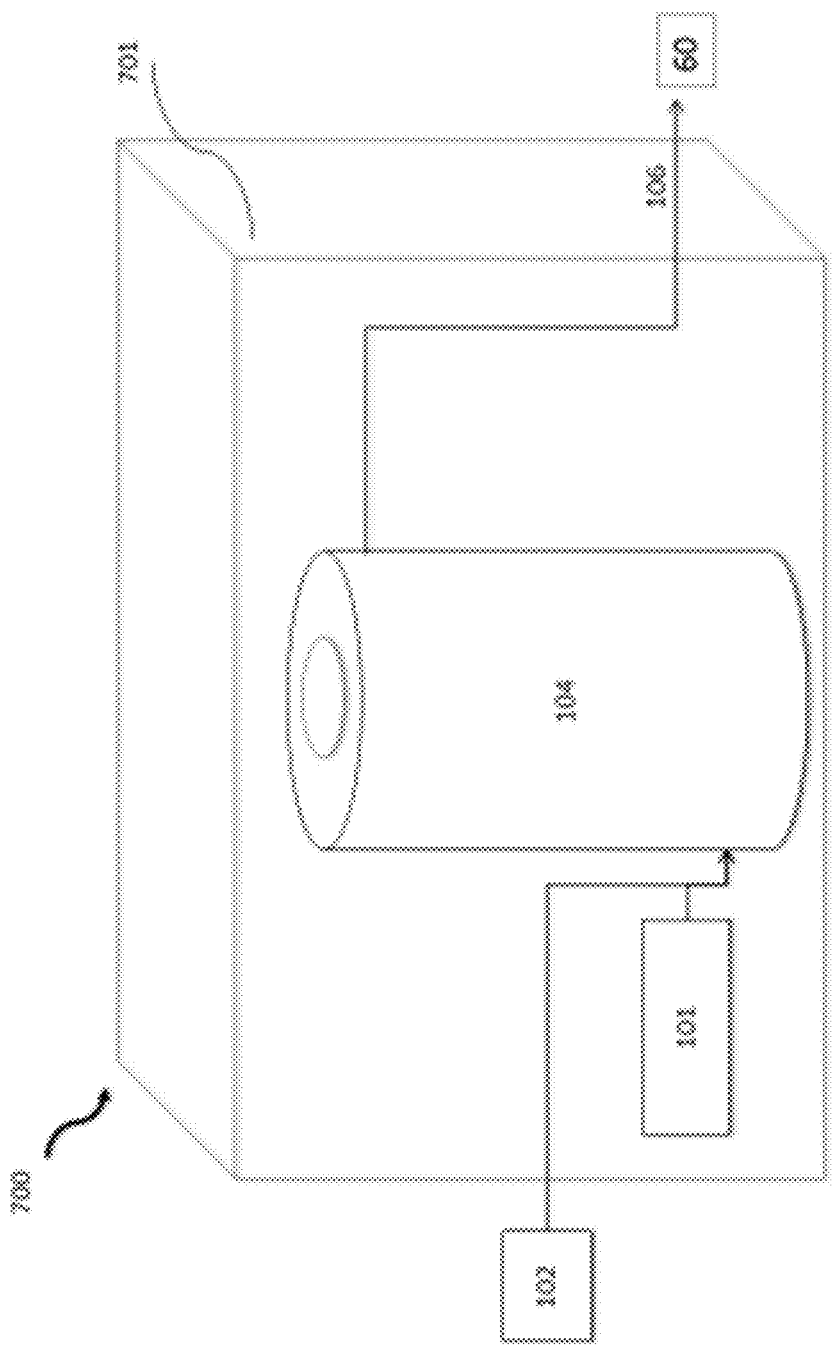
FIG. 9 is a schematic diagram of an alternate embodiment of an up-flow denitrification system in accordance with certain embodiments of the invention.

Referring to FIG. 9, an alternate embodiment of system 10 is illustrated. In this embodiment, all of the components (e.g. the bioreactor tower 104, carbon injection system 101 and other necessary components) of the bioreactor system 10 from FIG. 1 are mounted inside a shipping container 701. The container 701 can then be shipped or moved by a user to predetermined locations using existing farm equipment. In operation, a waste water source 102 is plumbed or connected to the container 701. Denitrified water exits the container 701 via drain 106 to a discharge point 60.

Figure 10:
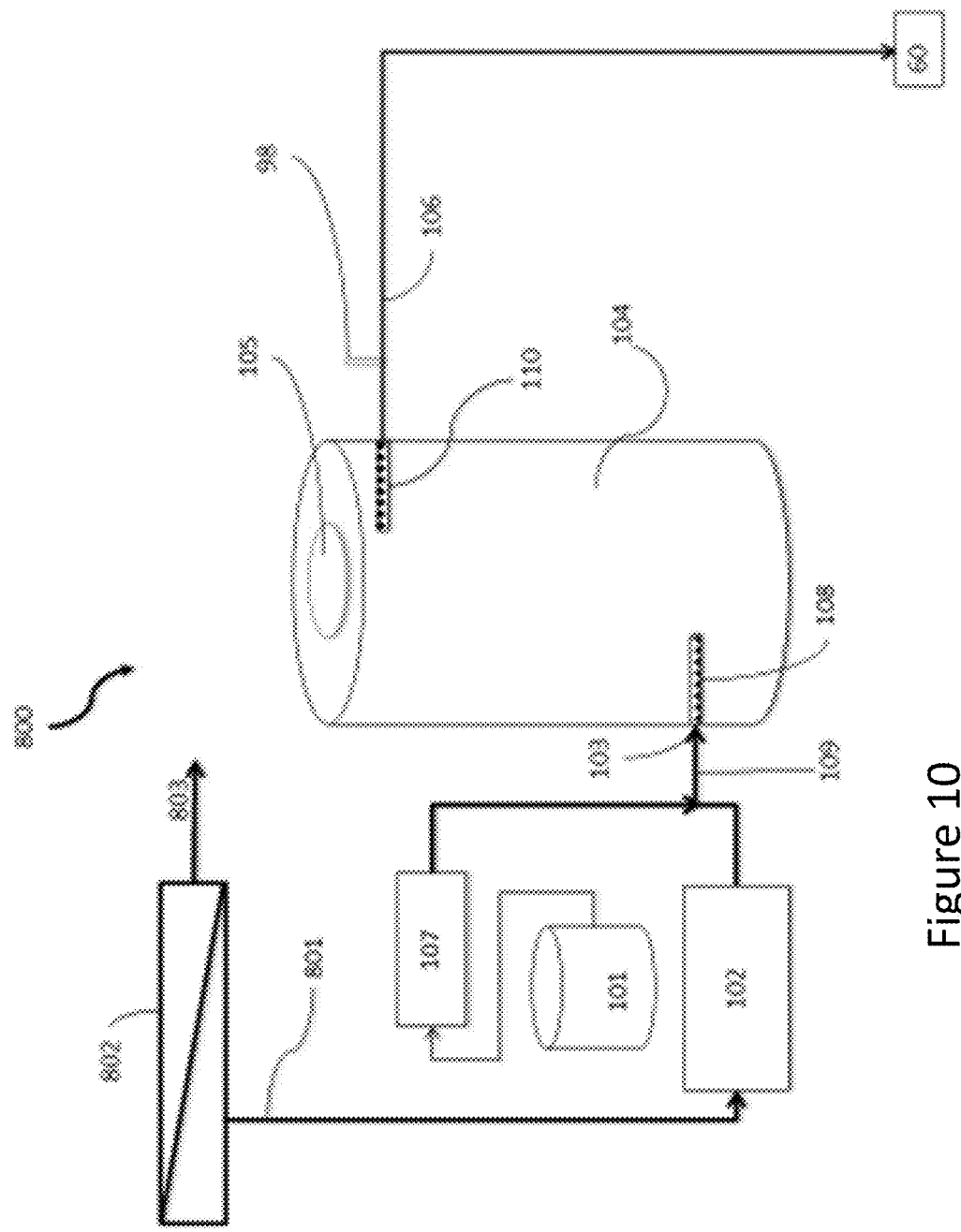
FIG. 10 is a schematic diagram of an alternate embodiment of an up-flow denitrification system in accordance with certain embodiments of the invention.

Referring to FIG. 10, an alternate embodiment of system 10 is illustrated. In this embodiment, drinking water system 800 comprises bioreactor 104 from FIG. 1 in combination with a reverse osmosis (RO) unit/system to provide drinking water 803. Specifically, a denitrifying bioreactor vessel 104 is placed in line, following reverse osmosis (RO) unit 802, and is used to remove the nitrate from the concentrate which exits the reverse osmosis (RO) unit 802 through a valve 801. The pressure from the concentrate provides the external pressurized water source 102 for the bioreactor 104. After traveling up through bioreactor 104, the denitrified concentrate can be safely discharged through line 106 into the local septic, leach field system or other surface disposal. The advantage of system 800 is ability to overcome the current prohibition against discharging reverse osmosis concentrate concentrated with nitrate back into the local septic or leach field system. Further, system 800 will clean the aquifer overtime as any denitrified water discharged into the septic system will return to the aquifer overtime.

In still other embodiments of the invention, the nutrient source (i.e. carbohydrate or alcohol) will be produced by the action of enzymes, biological and chemical catalysts, and bacteria that will convert a locally available and cost-efficient precursor to a nutrient carbon source. More specifically, acetate can be produced onsite for immediate use (i.e. "on the fly") by a mixed culture of bacteria fed by whey permeate (i.e. a lactose-containing waste product produced in very large volume by the milk and cheese industry in the US). This process is disclosed in *Wang, Zhu, Lewis, Tang*, (1992), the entire contents of which is incorporated herein. Many fruit, berry, and vegetable growers face internal costs of disposing of waste produce and, as such, locally available and fermentable agricultural waste products could enable agricultural operators to use their own waste byproducts to fuel the biological denitrification system, solving several environmental problems with a single solution.

Figure 11:
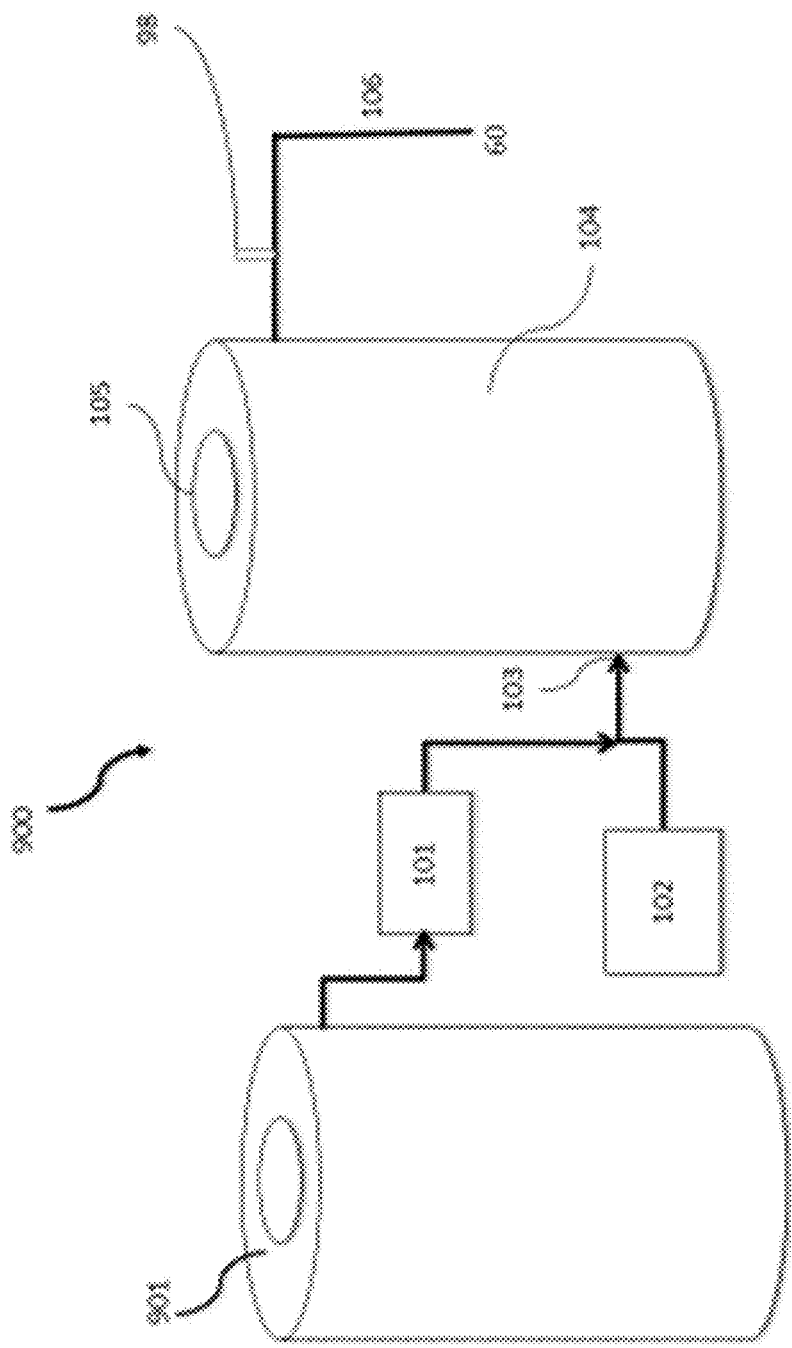
FIG. 11 is a schematic diagram of an alternate embodiment of an up-flow denitrification system in accordance with certain embodiments of the invention.

For example, and referring to FIG. 11, an alternate embodiment of system 10 is illustrated. In this embodiment, drinking water system 900 comprises bioreactor 104 from FIG. 1 in combination with an anaerobic, acetate bioreactor 901 that can produce acetate as carbon source 50 via a continuous fermentation process integrated with drinking water system 900. Specifically, acetate bioreactor 901 uses concentrate from berry and fruit waste produced locally and/or supplemented with lactose waste products. A vertical upflow bioreactor 901 using biofilm carriers 111, similar to the denitrifying bioreactor 104, is used to convert the waste agricultural products into acetate in water. In exemplary embodiments, for example, the bacterium S. Lactis, one of the bacterium involved in the whey permeate conversion to acetate, will thus ferment glucose, a component of the sugars found in many berries and fruit, to create acetate.

The resulting acetate and alcohol rich waste stream is metered directly into the bioreactor 104. In this way, carbon source 50 comprises an organic product or by-product of the fermentation of locally available agricultural waste products. The use of locally available and fermentable agricultural waste products enables agricultural operators to use their own waste byproducts to fuel the denitrification system, thus solving the nitrate-laden water issue and the issue with disposing unwanted agricultural waste.

Although not required, in certain systems it may be necessary to remove certain contaminants, bacterial growth or other trapped particles from the vessel and/or biofilm carriers. Accordingly, system 10 may comprise a backwash water inlet and system to assist in the removal of the same. In still other embodiments, additional techniques may be required. Accordingly, denitrification system 10 may further comprise an input or output devices and/or ports, the specification and design of which is dependent upon the circumstances of each contamination site, as will be understood by one skilled in the art.

Figure 12:
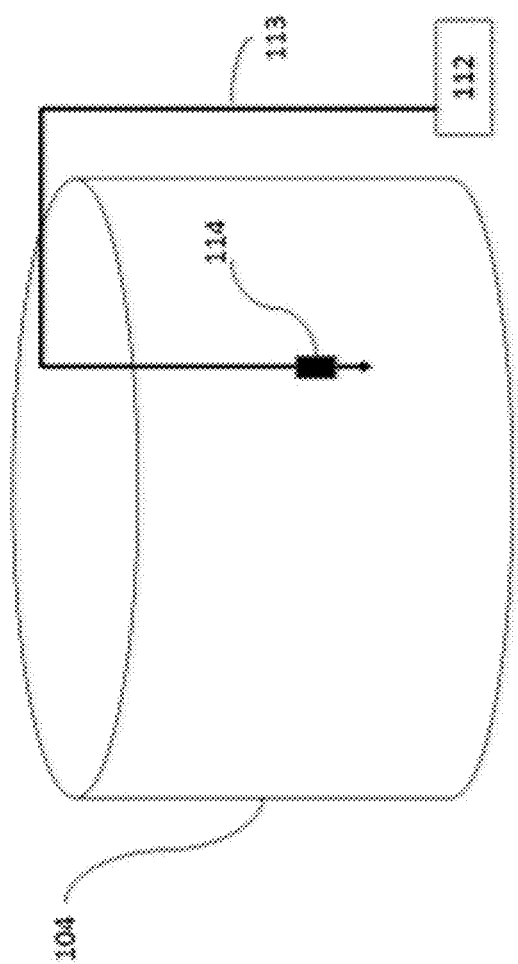
FIG. 12 is a schematic diagram of an alternate embodiment of an up-flow denitrification system in accordance with certain embodiments of the invention, wherein an air pump is incorporated.

For example, and referring to FIG. 12, once biofilm is established on carriers 111 in the bioreactor towers 104, periodic maintenance may be needed to insure that excess biofilm is thoroughly broken apart to prevent the formation of mats or clumps of biofilm carriers sticking together. In certain embodiments, bioreactor vessel 104 is operatively configured to automate the maintenance or cleaning process. More specifically, compressed air is injected from air pump 112 via air injection line 113 into the bioreactor. Check valve 114 prevents water from back filling the air injection line 113. The compressed air bubbles injection into the bioreactor substantially or completely break apart the mats and/or clumps formed by biofilm carriers 111.

In still other embodiments, as discussed herein, two or more unpressurized bioreactor vessels 104 can be employed in the compact, modular denitrification system, with the bioreactors being connected in parallel (not shown). In this embodiment, provided the vessels 104 are configured in parallel, the system can still remain unpressurized and any number of water tanks can be utilized to achieve the desired nitrate removal, even at very high nitrate levels.

As will be understood by those skilled in the art, aeration, air sparging and other pre- and post-treatment systems of the type described herein are commonly employed in water treatment processes and are available from various commercial manufacturers.

EXAMPLES

Up-flow, anaerobic denitrification systems in accordance with some embodiments of the present invention have been tested. Discussed below are some details of the process, testing, and results of such tests. Note that such tests are exemplary and do not alone encompass the entirety of the present invention.

Tests were conducted to evaluate the performance of the denitrification systems with respect to the following:

TABLE 1

| | |
|---|---|
| Inoculation Date | Dec. 20, 2018 |
| Wastewater Source- | Tile Drain Sump Pump |
| Duty Cycle | 4 hrs per day |
| Flow Rates - Design | 100 mg/L input of NO3—N at 8 GPM |
| Flow Rates - Actual | 60$^+$ mg/L input of NO3—N at 10$^+$ GPM |
| Configuration | 10 GPM system contained within 10 × 20' container/ |
| Power consumption | 500 watts average |
| Nitrate Removal at actual flow rates | 95-99% |

TABLE 2

| Sample Data | |
|---|---|
| Test Date | Feb. 13, 2018 |
| Inlet | 62.5 mg/L NO3—N |
| Outlet | <0.1 mg/L NO3—N (undetectable) |
| Percent reduction of NO3—N | 99%+ removal |

Monitoring and Control Systems

In certain embodiments, use of the modular denitrification bioreactors disclosed herein will require appropriate monitoring and control systems in order assure safe operation. For example, in certain embodiments, the system will comprise monitoring of POE drinking water systems to comply with state and federal requirements.

Additionally, while manual reading of gauges and meters in certain embodiments will be appropriate, the use of automated, continuous electronic monitoring in certain embodiments will provides certain benefits, for example but not limited to, rapid notification of a change in operating conditions or the need to perform preventive maintenance. As such, in accordance with embodiments of the invention, the following automated, electronic monitoring systems may be incorporated into mobile denitrification system disclosed herein. By way of example, monitoring devices operable to measure denitrification process parameters may include process flow measurements, hours of operation, influent quality measurements, effluent quality measurements, ORP, nutrient concentrations and nitrate/nutrient ratios, pH, temperature, total suspended solids and overall system status.

Figure 13:
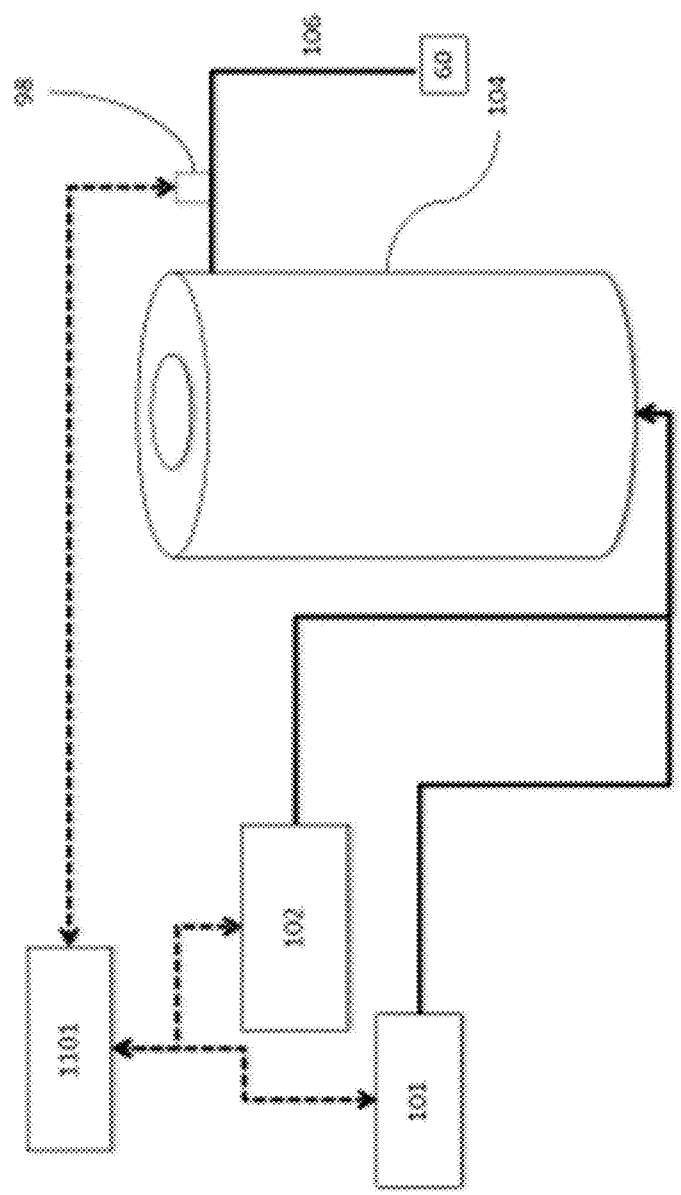
FIG. 13 is a schematic diagram of one embodiment of a monitoring and control system, in accordance with one or more aspects of the present invention.

Referring to FIG. 13, an alternate embodiment comprising system controller 1102, wherein system controller 1101 comprises one or more automated, electronic monitoring and/or control systems. In these embodiments of the invention, the denitrification system disclosed herein further comprises a system, device, method, and/or a computer program product, operatively configured to perform or facilitate either remote or onsite monitoring and/or control functions.

For example, in certain embodiments, system controller 1101 is a programmable logic controller or other programmable controller known in the art. In operation, for example, a system configuration is provided similar to that shown in FIG. 1 (system 10), which includes a bioreactor vessel 104, pressurized water source 102, carbon injection system 101 and output sensors 98, in accordance with one or more aspects of the present invention. In this embodiment, control system 1101 communicates electronically with one or more of the system components. By way of example, pressurized water source 102 is turned on and off by a signal from the control system 1101, and/or carbon injection system 101 is controlled in a feedback loop from sensor 98 or directly from control system 1101. In still other embodiments, control system 1101 can store relevant operational information or "raw data" in non-volatile memory within the controller. As such, in the case of a power loss or restart, the system can resume operation without loss of data.

Figure 14:
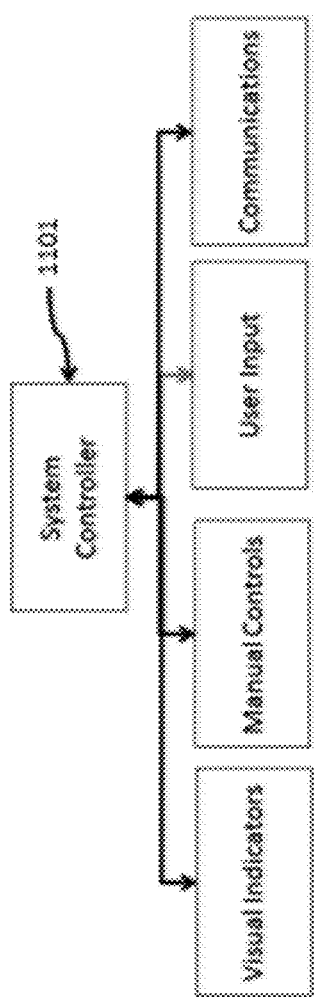
FIG. 14 is a schematic diagram of an alternate embodiment of the monitoring and control, in accordance with one or more aspects of the present invention.

FIG. 14 illustrates the basic functions of system controller 1101 in certain embodiments in accordance with the invention. In certain embodiments, system controller 1101 consists of at least four major functional subsystems, i.e. Visual Indicators, Manual Controls, User Input, and Communications, wherein each subsystem function comprises a manual and electronic user interface. In embodiments herein, the visual indicators may include visual and audible alarms, and the manual controls may include start and stop buttons. The user input allows an operator with the right credentials to access the control system 1101 via touch screen or keypad. The communications module collects information from the system controller 1101 and transmits this via wired or wireless methods to a remote database.

Figure 15:
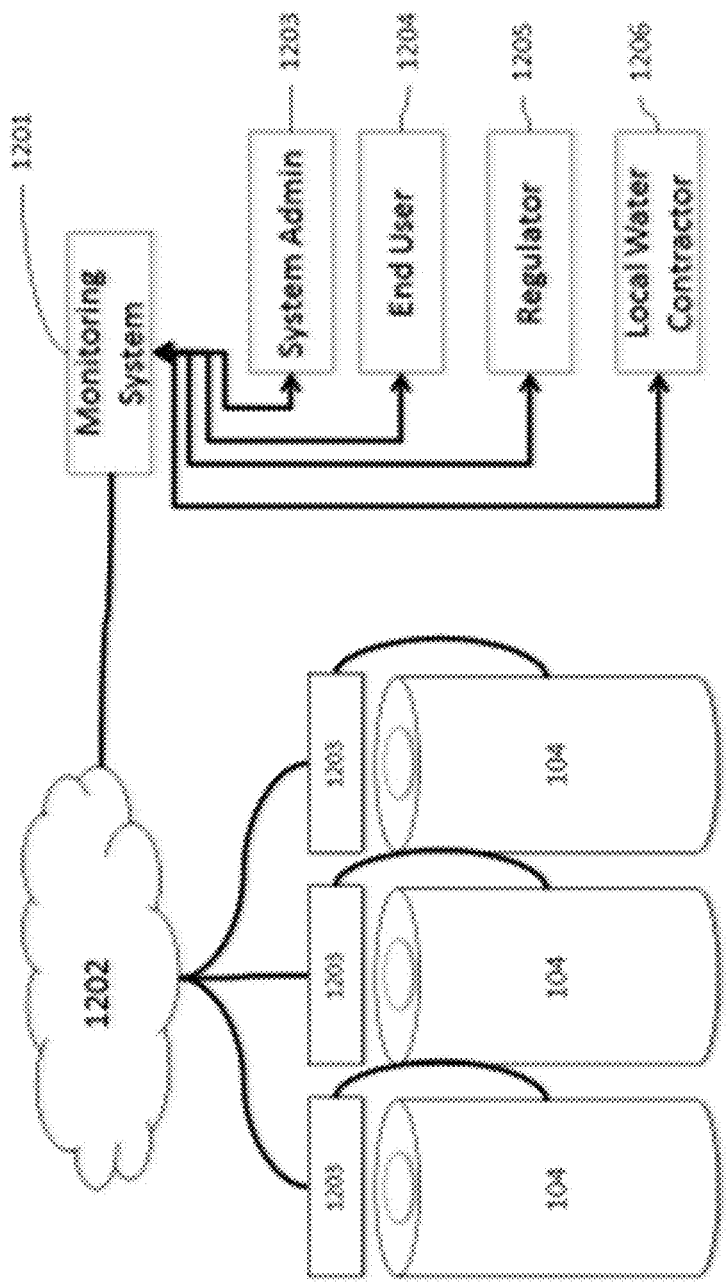
FIG. 15 is a schematic diagram of one embodiment comprising a comprehensive system network, in accordance with one or more aspects of the present invention.

FIG. 15 shows a plurality of bioreactor vessel 104 in a network and operatively configured with a monitoring system 1201 and one or more control systems 1203, all in operative communication with a cloud-based database 1202. In certain embodiments, each bioreactor vessel 104 is equipped with and in operative communication with one or more controllers or control systems 1203, which in turn are in communication with and send information to a cloud-based database 1202.

Furthermore, in certain embodiments, monitoring system 1201 comprises monitoring software which communicates to both the cloud database 1202 and the bioreactors 104 via the Internet. By way of example, monitoring system 1201 retrieves data from the cloud-based database 1202 and performs a variety of system functions for overall administration 1203, end users presentation 1204, regulatory access 1205, and a local maintenance and contractor access 1206. For end users presentation 1204, monitoring system 1201 collects and analyzes data from the cloud database 1202 and prepares specialized reports for each of the different users. System Admin interface 1203 can be controlled by a third party that runs the monitoring system network 1201. System Admin 1203 has complete control over all operational parameters of the other functions, end users presentation 1204, regulatory access 1205, and a local maintenance and contractor access 1206.

As such, in accordance with certain embodiments of the invention, monitoring system 1201 is provided which allows, for example, a contractor, end user and/or a government regulator, to a have access to the monitoring data. Furthermore, the monitoring system 1201 may comprise features that enable each group access only to specific data and limits any remote commands sent to the system that can affect its operation. In embodiments of the invention, the following parameters may be monitored via monitoring system 1201: volumetric flow measurements, total flow measurements, hours of operation, influent quality measurements, effluent quality measurements, ORP, nutrient concentrations and nitrate/nutrient ratios, pH, temperature, total suspended solids and overall system status (normal/fault).

In operation, remote monitoring software and equipment is known in the art and one of ordinary skill in the art can use existing methods for collecting data from operating equipment, either via wired and/or wireless (including cellular) communication techniques. For example, embodiments of the invention may utilize supervisory control and data acquisition (SCADA) as a control system architecture to configure computers, and networked data communications, along with programmable logic controllers and/or other controllers to interface with the bioreactor vessels 104. In these embodiments, the real-time control logic or controller calculations will be performed by networked modules in communication with the monitoring devices 98 and controllers 1203.

In still other embodiments, system 1201 can transmit or interact with smartphones or similar devices that are within range of the bioreactors 104, for example via Bluetooth® technology known in the art. This range could be, for instance, from 1 to 10 meters. In still other embodiments, monitoring systems comprise a local wireless access point at the equipment location and any suitable device within range and with the correct credentials can access data being provided by the equipment hot spot. In still other embodiments, the system will log data locally, for example, at the one or more system controllers 1203. In these embodiments, the user physically interacts with the data logger, transfers the data from the equipment to a suitably equipped smartphone, tablet or PC, then analyzes the data.

In some embodiments, the control aspects of the present invention may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instructions contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C#, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims. In other words, this invention is subject to many different forms and shapes and the preferred method shown illustrations have certain details with the understanding that the present disclosure should be considered as an example of the basic principles of the invention and it is not intended to limit variations of the device, system and/or method to other sizes, configurations and materials.

For example, all locations, sizes, shapes, proportions, measurements, amounts, angles, component locations, part locations, fasteners, configurations, weights, dimensions, values, percentages, materials and/or orientations discussed above or shown in the drawings are merely by way of example and are not considered limiting and other locations, sizes, shapes, proportions, measurements, amounts, angles, component locations, part locations, fasteners, configurations, weights, dimensions, values, percentages, materials and/or orientations can be chosen and used and all are considered within the scope of the invention.

Dimensions of certain parts as shown in the drawings may have been modified and/or exaggerated for the purpose of clarity of illustration and are not considered limiting.

Unless feature(s), part(s), component(s), characteristic(s) or function(s) described in the specification or shown in the drawings for a claim element, claim step or claim term specifically appear in the claim with the claim element, claim step or claim term, then the inventor does not considered such feature(s), part(s), component(s), characteristic(s) or function(s) to be included for the claim element, claim step or claim term in the claim for examination purposes and when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modification disclosed herein. Thus, a wide variety of alternatives, suggested by the teachings herein, can be practiced without departing from the spirit of the invention, and rights to such alternatives are particularly reserved and considered within the scope of the invention.

I claim:

1. A method of treating nitrate-contaminated water using a mobile, modular water or wastewater treatment system comprising the steps of:

providing a nitrate-contaminated source water not yet treated by the system and capable of being treated by anaerobic denitrification;

providing a denitrifying upflow bioreactor, in the system, configured to operate under anaerobic, denitrifying conditions comprising a pH in the range of 6.5 to 7.5 and dissolved oxygen levels sufficient to promote anaerobic conditions within the bioreactor, and said bioreactor comprises one or more plastic water tanks, wherein each of the one or more plastic water tanks has a volume in the range of 600 to 6000 gallons and a single, anaerobic internal chamber defined by a vertically-extending housing that forms a wall, a bottom and a cover and defining a vertical passageway for the nitrate-contaminated influent to flow in an upward vertical flow direction through the plastic water tank, and wherein the one or more plastic water tanks is substantially filled with biofilm carrier elements comprising synthetic biofilm carriers formed from extruded plastic with a diameter in the range of 0.75 to 2.0 inches, and adapted for growing at least one anaerobic, denitrifying bacteria colony thereon, wherein the upflow bioreactor is configured to receive the nitrate-contaminated source water from an external, pressurized water source through at least one influent inlet located substantially at or near the bottom of the one or more plastic water tanks and is further configured to discharge denitrified water through at least one effluent port located at or near the top of the one or more plastic water tanks;

providing a source of one or more anaerobic, denitrifying bacteria effective for biological denitrification under anaerobic conditions;

providing a source of one or more nutrients to promote biological denitrification, the nutrients selected from the group comprising a single carbon source, a pre-mixed multiple carbon source, a micronutrient, and combinations thereof;

introducing the nitrate-contaminated source water not yet treated by the system from the external, pressurized water source into the one or more plastic water tanks substantially filled with biofilm carrier elements, so that the source water flows upwards therethrough at a predetermined flow rate; and directing a denitrified effluent from at least one of the effluent ports located at or near the top of the one or more plastic water tanks to an external discharge point configured external to the system for receiving denitrified effluent discharged from the bioreactor, thereby creating an open-loop denitrification system such that the denitrified effluent discharged from the bioreactor does not flow back into the bioreactor;

wherein the nitrate contained within the nitrate-contaminated source water is converted to nitrogen gas and discharged from the system through a vent located on a top portion of the one or more plastic water tanks; and wherein, in said system for removing nitrate from water or wastewater, the system first performs denitrification on the water or wastewater entering the system from the external water source within the bioreactor such that the water or wastewater received by the bioreactor has not been pre-denitrified by the system.

2. The method according to claim 1, further comprising the step of transporting the mobile, modular water or wastewater treatment system to a location where there is a source of nitrated-contaminated source water to be treated.

3. The method according to claim 1, further comprising:
transmitting operational data from the system to a remote host;
providing the operational data to different users based on their system credentials; and
allowing the different users to interact with the system based on their system credentials.

4. A mobile, modular water or wastewater treatment system for removing nitrate from water or wastewater, comprising:
a denitrification bioreactor configured to receive the water or wastewater to be treated from an external water source, wherein the external water source is a pressurized water source for supplying the water or wastewater into the system and the water or wastewater entering the system is a nitrate-contaminated influent not yet treated by the system, and wherein the denitrification bioreactor is further configured to operate under anaerobic, denitrifying conditions, wherein the anaerobic, denitrifying conditions comprise a pH in the range of 6.5 to 7.5 and dissolved oxygen levels sufficient to promote anaerobic conditions within the bioreactor;
a source of one or more anaerobic, denitrifying bacteria effective for biological denitrification under anaerobic conditions;
a source of one or more nutrients to promote biological denitrification, the nutrients selected from the group comprising a single carbon source, a pre-mixed multiple carbon source, a micronutrient, and combinations thereof, and
an external discharge point configured external to the mobile, modular water or wastewater treatment system for receiving denitrified effluent discharged from the denitrification bioreactor, thereby creating an open-loop denitrification system such that the denitrified effluent discharged from the denitrification bioreactor does not flow back into the denitrification bioreactor;
wherein the denitrification bioreactor comprises at least one unpressurized, upflow bioreactor vessel comprising:
a plastic water tank with a volume in the range of 600 to 6000 gallons, the water tank having a single, anaerobic internal chamber defined by a vertically-extending housing that forms a wall, a floor and a cover and defining a vertical passageway for the nitrate-contaminated influent to flow in an upward vertical flow direction through the bioreactor vessel,
a vent located on a top portion of the water tank configured to discharge gas released from the influent and thereby release pressure from the bioreactor vessel;
a plurality of biofilm carrier elements disposed in and partially filling the bioreactor vessel, wherein the plurality of biofilm carrier elements comprise synthetic biofilm carriers formed from extruded plastic with a diameter in the range of 0.75 to 2.0 inches, and are configured to grow a denitrifying bacteria consortia thereon for denitrification of the nitrate-contaminated influent as the influent flows upward through the bioreactor vessel; and
an effluent port located in a top portion of the bioreactor vessel, fluidically connected to the external discharge point and operably configured to discharge the denitrified effluent from the bioreactor vessel to the external discharge point,
and wherein, in said mobile, modular water or wastewater treatment system for removing nitrate from water or wastewater, the system first performs denitrification on the water or wastewater entering the system from the external water source within the denitrification bioreactor such that the water or wastewater received by the denitrification bioreactor has not been pre-denitrified by the mobile, modular water or wastewater treatment system.

5. The system of claim 4 wherein the denitrification bioreactor comprises a plurality of unpressurized, upflow bioreactor vessels connected in parallel.

6. The system of claim 4, further comprising a supply tank for storing the nitrate-contaminated influent prior to entering the denitrification bioreactor and operatively configured to produce reduced dissolved oxygen levels in the nitrate-contaminated influent under aerobic conditions.

7. The system of 4 configured to operate at a variable flow rate in the range of 2 to 200 gallons per minute (GPM) and a variable flow rate per unit area in the range of 0.3 GPM/ft$^2$ to 2.0 GPM/ft$^2$ through the at least one bioreactor vessel.

8. The system of claim 7 further comprising a variable frequency drive (VFD) for adjusting the flow rate through the at least one bioreactor vessel.

9. The system of claim 4, wherein the system is substantially modular, compact, and mobile.

10. The system of claim 9 further comprising a stabilizing foundation, wherein the foundation comprises a concrete pad or gravel foundation.

11. The system of claim 4, further comprising a pump configured to control a rate of the nutrient source injected into the system, wherein the rate of the nutrient source injected into the system is dependent on an oxidation-reduction potential target value of −50 to +50 mV when measured at the discharge point in order to maintain a carbon-nitrogen-phosphorus ratio effective for anaerobic, denitrification to occur in at least one bioreactor vessel.

12. The system of claim 4, wherein the nutrient source comprises a carbon source, said carbon source comprising a carbohydrate or alcohol, selected from the group comprising acetate, glucose, sugar, corn syrup, cellulose, galactose, maltose, fructose, methanol, ethanol, ethylene glycol, glycerol, and combinations thereof.

13. The system of claim 12, wherein the nutrient source is a premixed carbon source comprising an organic by-product of fermented agricultural produce or agricultural waste products.

14. The system of claim 13, wherein the premixed carbon source is acetate.

15. The system of claim 11, wherein a micronutrient in the nutrient source is phosphorus.

16. The system of claim 4, wherein the water source is a pressurized water source produced by an elevation differential between the water source and the denitrification bioreactor.

17. The system of claim 4, wherein the denitrifying bacteria comprise bacteria from the species *Pseudomonas Stutzeri*.

18. The system of claim 4 wherein the source of the one or more anaerobic, denitrifying bacteria is a nitrate-containing source located proximate the water source and is selected from the group consisting of ponds, drainage ditches, groundwater, surface water, runoff, irrigation water, and combinations of the same.

19. The system of claim 4 wherein the plurality of biofilm carrier elements fill 40 to 90% of the water tank volume.

20. The system of claim 4, further comprising a monitor and control system, wherein said monitor and control system comprises at least one monitoring device configured to collect operational data from the system and communicate said data via electronic means and to measure denitrification process parameters selected from at least one of the group consisting of process flow measurements, hours of operation, influent quality measurements, effluent quality measurements, ORP, nutrient concentrations and nitrate/nutrient ratios, pH, temperature, total suspended solids and overall system status.

21. The system of claim 4, further comprising an influent inlet, said inlet located substantially at or near the floor of the at least one bioreactor vessel and configured to receive the nitrate-contaminated influent into a lower portion of the at least one bioreactor vessel, wherein the influent inlet is in fluid communication with a source inlet pipe fluidically connected to the pressurized water source, thereby creating a vertical, up flow during operation of the denitrification bioreactor.

22. The system of claim 21, wherein the influent inlet is in fluid connection with an injector assembly configured to introduce the nitrate-contaminated influent into the at least one bioreactor vessel so as to reduce channeling and provide optimal distribution of nitrate-contaminated influent throughout the at least one bioreactor vessel, the injector assembly comprising an H-shaped assembly with a horizontally disposed inlet pipe, having a distal end and a proximal end, wherein the proximal end of the horizontally disposed inlet pipe is adapted to be fluidically connected to the water source; a center stem pipe having a first and second end, wherein the distal end of the horizontally disposed inlet pipe is fluidically connected substantially midway between the first and second end of the center stem pipe; a first and second transverse pipe having terminal ends comprising perforated end caps, wherein said center stem pipe, and first and second transverse pipes are operatively configured in an H-junction;

and further comprising at least one structural support mechanism.

* * * * *